(12) United States Patent
Muraishi

(10) Patent No.: US 9,973,653 B2
(45) Date of Patent: May 15, 2018

(54) IMAGE PROCESSING APPARATUS AND IMAGE PROCESSING METHOD

(71) Applicant: CANON KABUSHIKI KAISHA, Tokyo (JP)

(72) Inventor: Masaaki Muraishi, Musashino (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days. days.

(21) Appl. No.: 14/248,616

(22) Filed: Apr. 9, 2014

(65) Prior Publication Data
US 2014/0320934 A1    Oct. 30, 2014

(30) Foreign Application Priority Data

Apr. 24, 2013  (JP) .................................. 2013-091783

(51) Int. Cl.
H04N 1/40 (2006.01)
H04N 1/407 (2006.01)
H04N 1/38 (2006.01)

(52) U.S. Cl.
CPC ............ *H04N 1/4074* (2013.01); *H04N 1/38* (2013.01)

(58) Field of Classification Search
None
See application file for complete search history.

(56) References Cited

U.S. PATENT DOCUMENTS

| 6,549,302 B1* | 4/2003 | Takeda et al. ............... 358/1.9 |
| 2003/0072568 A1* | 4/2003 | Lin et al. ..................... 396/222 |
| 2006/0233452 A1* | 10/2006 | Yang ............................. 382/254 |
| 2009/0116738 A1* | 5/2009 | Kubota ........................ 382/165 |
| 2011/0164284 A1* | 7/2011 | Dai ............................. 358/3.06 |
| 2012/0120432 A1* | 5/2012 | Hirohata et al. ............ 358/1.13 |

FOREIGN PATENT DOCUMENTS

| JP | H11-048456 A | 2/1999 |
| JP | 2003-189170 A | 7/2003 |
| JP | 2004-289496 A | 10/2004 |
| JP | 2009-246720 A | 10/2009 |
| JP | 2010-056803 A | 3/2010 |
| JP | 2010-178377 A | 8/2010 |
| JP | 2010-191941 A | 9/2010 |
| JP | 2012-129746 A | 7/2012 |

OTHER PUBLICATIONS

Japanese Office Action issued Apr. 11, 2016 in corresponding Japanese Patent Application No. 2013091783, 4 pages.

* cited by examiner

Primary Examiner — Vincent Rudolph
Assistant Examiner — Michael Burleson
(74) Attorney, Agent, or Firm — Carter, DeLuca, Farrell & Schmidt, LLP

(57) ABSTRACT

Read image data is divided into a plurality of regions, and a histogram is generated and edges are counted for each region. Blank page detection is performed based on a variance value computed from the histogram of each region. Also, the variance between regions is computed from the edge count of each region, and blank page detection is performed according to the amount of variance. It is then determined whether the document is blank or content based on the result of detection by histogram and the result of detection by edge count.

17 Claims, 25 Drawing Sheets

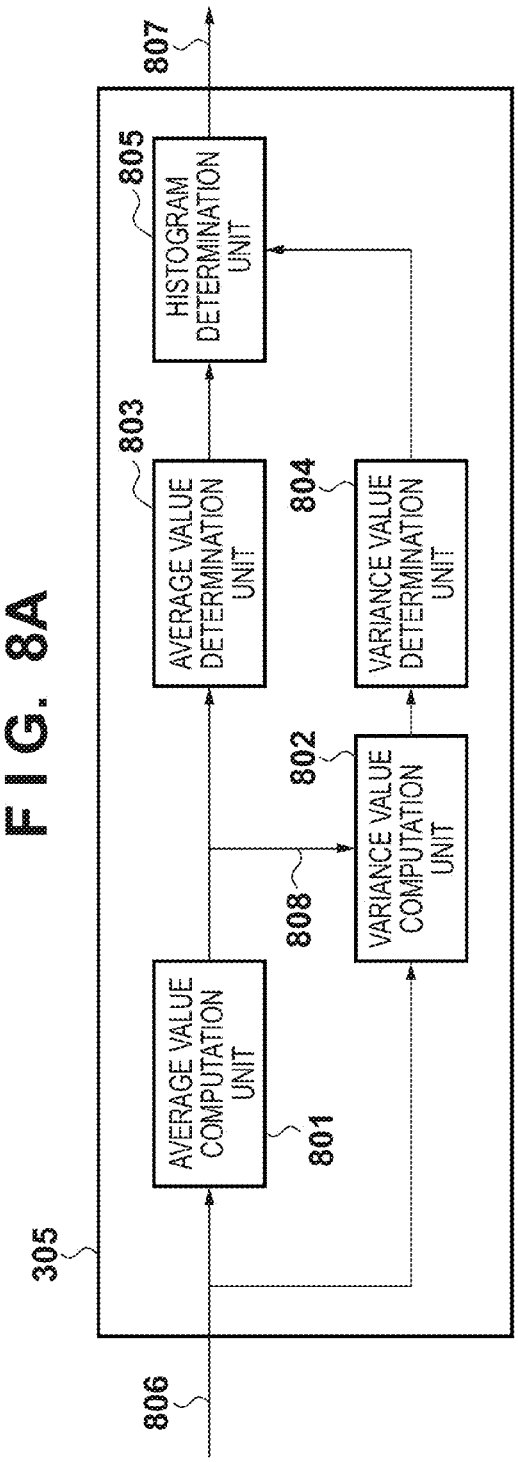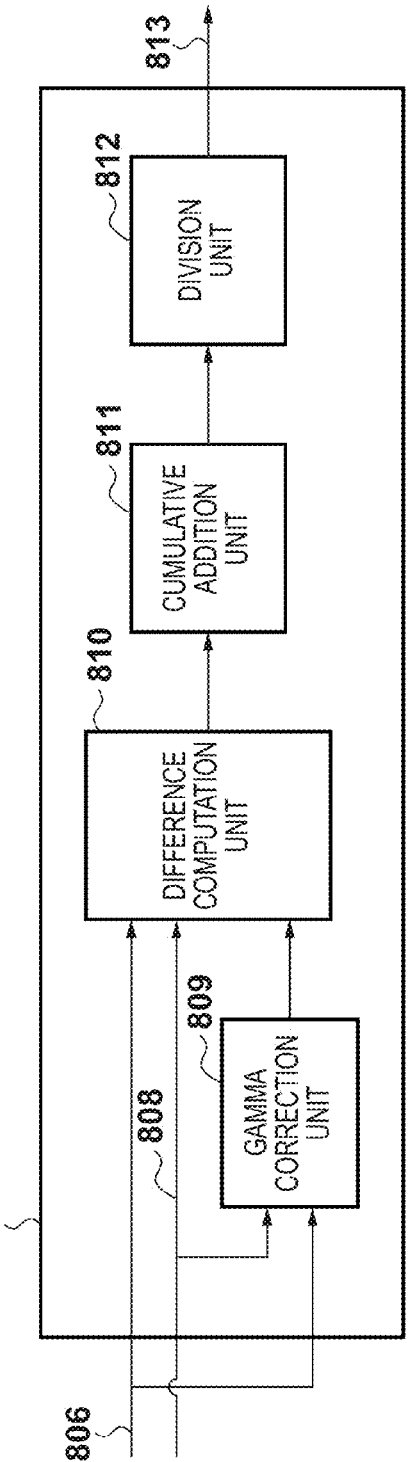

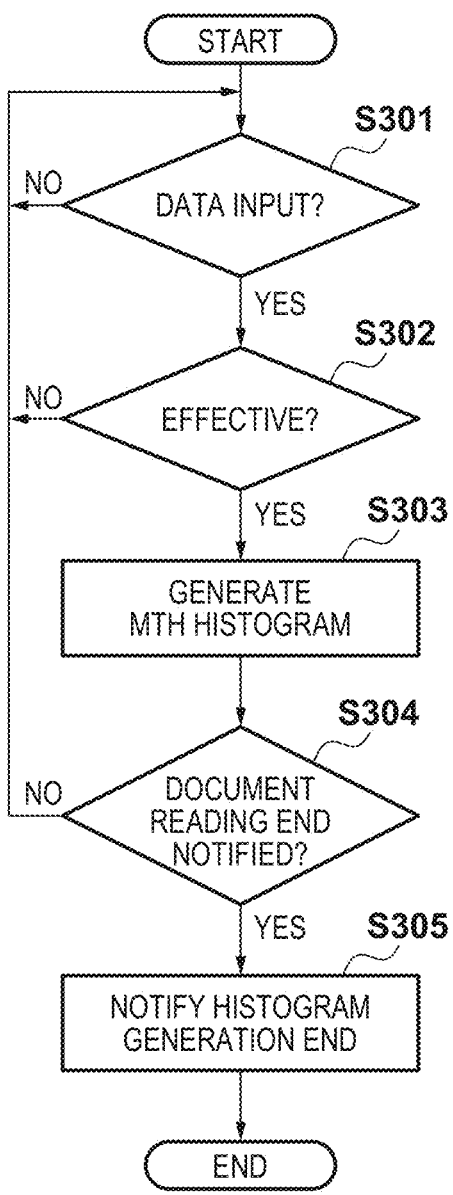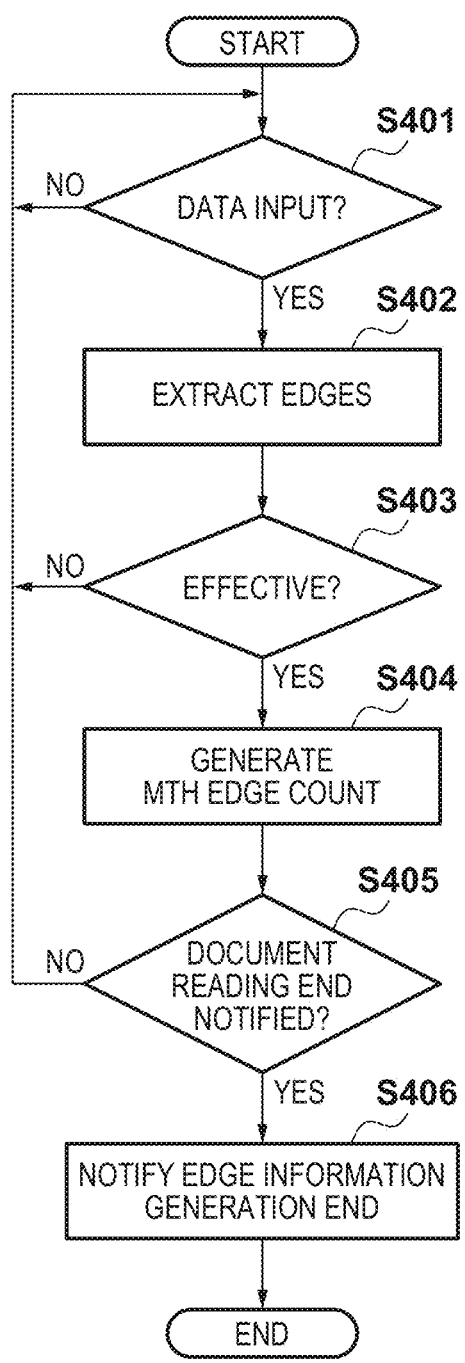

FIG. 19

| No. | IMAGE | BLANK OR CONTENT |
|---|---|---|
| 1 | | BLANK |
| 2 | | BLANK |
| 3 | ABC | CONTENT |
| 4 | | BLANK |
| 5 | ABC | CONTENT |
| 6 | | BLANK |
| 7 | ABC | CONTENT |
| 8 | | CONTENT |
| 9 | | BLANK |

FIG. 22

TRUE = DESIRED RESULT
FALSE = UNDESIRED RESULT

| No | IMAGE | BLANK OR CONTENT | DETERMINATION RESULT | |
| --- | --- | --- | --- | --- |
| | | | PRESENT INVENTION | CONVENTIONAL ART |
| 1 | | BLANK | TRUE | TRUE |
| 2 | | BLANK | TRUE | TRUE |
| 3 | ABC | CONTENT | TRUE | FALSE |
| 4 | | BLANK | TRUE | TRUE |
| 5 | ABC | CONTENT | TRUE | FALSE |
| 6 | | BLANK | TRUE | TRUE |
| 7 | ABC | CONTENT | TRUE | FALSE |
| 8 | | CONTENT | TRUE | TRUE |
| 9 | | BLANK | TRUE | TRUE |

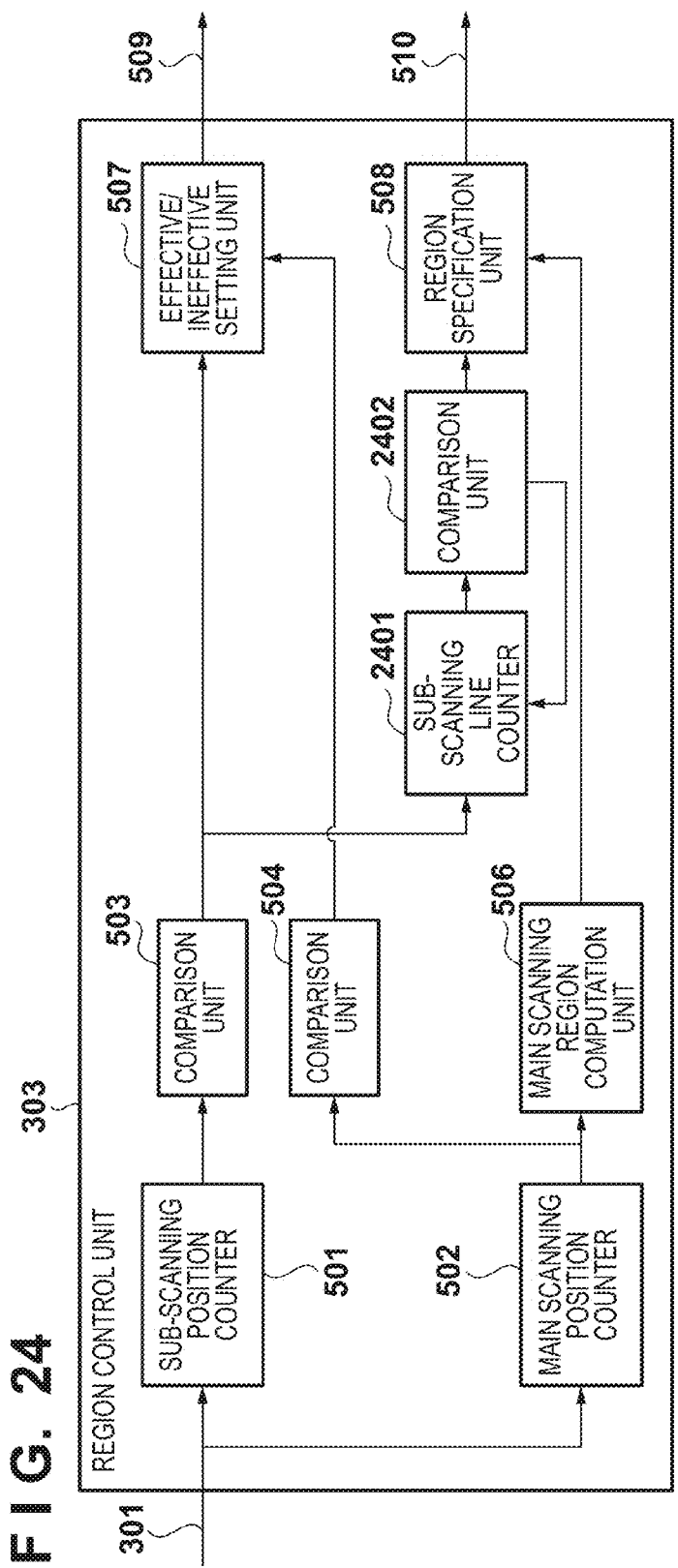

F I G. 27
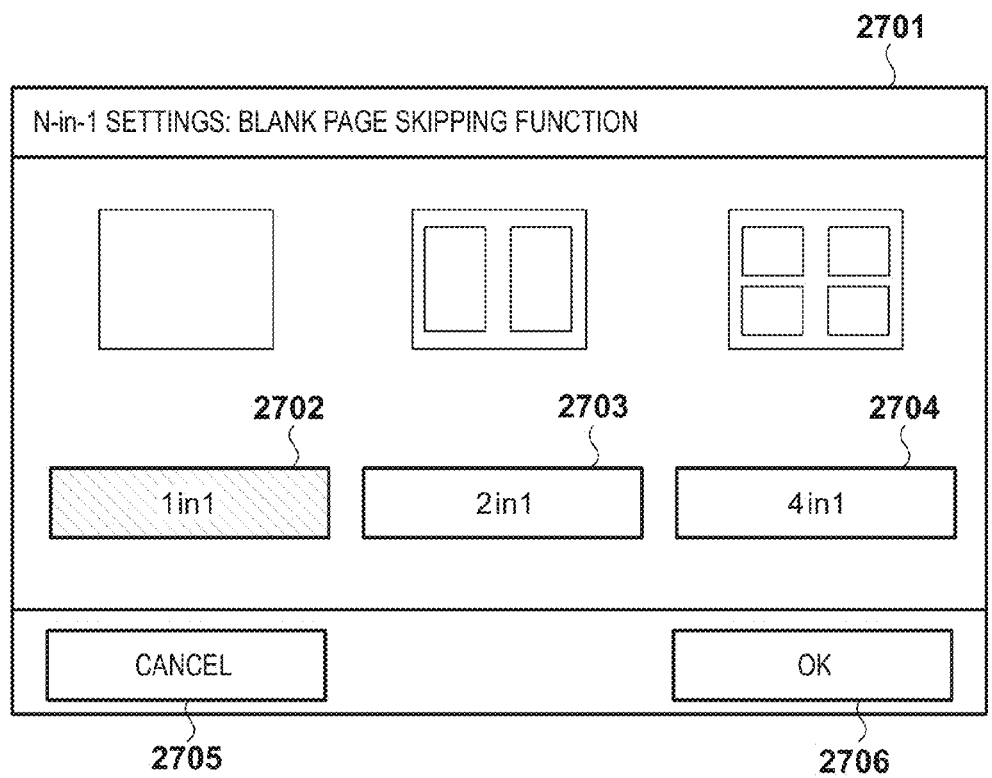

IMAGE PROCESSING APPARATUS AND IMAGE PROCESSING METHOD

BACKGROUND OF THE INVENTION

Field of the Invention

The present invention relates to an image processing apparatus and an image processing method that determine whether read image data, for example, is image data that has print information or is image data of a blank page that does not have print information.

Description of the Related Art

Heretofore, in a multifunction peripheral with an automatic document reader, for example, even in the case where a document printed on both sides and a document printed on one side are loaded together, both sides will be copied when double-sided copy is instructed, resulting in wasteful processing and consumption of paper and electricity. In view of this, various blank page detection methods have been devised that are intended to suppress wasteful printing and consumption of paper and toner by detecting blank pages included in read image data and deleting image data discriminated as blank.

Japanese Patent Laid-Open No. 2010-191941 proposes a blank page determination method that involves generating a histogram of pixel values from image data, counting pixels other than the background color, and determining whether the document is blank from a ratio of the counted pixels to the number of pixels for the entire image.

On the other hand, Japanese Patent Laid-Open No. 2010-178377 proposes a blank page determination method that involves detecting edge portions in image data from the image data read from the document, and determining whether the document is blank based on the proportion of the overall number of pixels occupied by the amount of edges.

However, document paper to be read includes so-called non-white paper, such as color paper and recycled paper that contains impurities. Unexpected image objects that are not recorded may also be included in the image data. For example, dust adhering to the document or reading-related noise may be included the image data. So-called show-through where the image recorded on the reverse side can be seen on the target side may also be read. These various conditions can lead to image objects being falsely recognized as a recorded image. Thus in the method disclosed in Japanese Patent Laid-Open No. 2010-191941 or Japanese Patent Laid-Open No. 2010-178377, since the color of the paper or unexpected image objects appear in the histogram or an edge is detected if an unexpected image object is a sharp image, image objects that are not originally included in the image may be falsely recognized as being included in the image. Sheets may thus be determined to not be blank even though they are blank. When noise, dust or the like, for example, are removed with the intention of preventing such false recognition, sheets are conversely may also be determined to be blank even though they are not blank.

Thus, even using the conventional technology disclosed in Japanese Patent Laid-Open No. 2010-191941 or Japanese Patent Laid-Open No. 2010-178377, it is not easy to appropriately discriminate between image data obtained by reading a document on which a small amount of text is printed and image data obtained by reading a document on which there are spot. Also, it is not easy to appropriately detect document data obtained by reading paper containing many impurities or image data obtained by reading a document that is only show-through as being blank.

SUMMARY OF THE INVENTION

The present invention, which has been made in view of the above problems, solves these problems and improves the accuracy of blank page determination.

According to a first aspect, an image processing apparatus of the present invention comprises: a division unit that divides image data obtained by reading a document into a plurality of regions; and a first determination unit that acquires a variance in pixel values obtained from the image data of each region obtained through division by the division unit, and determines whether the document is blank using the acquired variance values.

Also, according to a second aspect, an image processing apparatus of the present invention comprises: a division unit that divides image data obtained by reading a document into a plurality of regions; a selection unit that acquires an edge count obtained from the image data of each region obtained through division by the division unit, and selects a first edge count and a second edge count from the plurality of acquired edge counts; and a second determination unit that determines whether the document is blank using the first edge count and the second edge count selected by the selection unit.

According to the present invention, the accuracy of blank page determination for determining whether read image data has print information or is a blank page that is not in a printed state can be improved.

Further features of the present invention will become apparent from the following description of exemplary embodiments with reference to the attached drawings.

BRIEF DESCRIPTION OF THE DRAWINGS

FIGS. 8A and 8B are diagrams showing a configuration of a histogram analysis unit.

FIG. 13 is a diagram showing the control flow of the histogram generation unit in the first embodiment.

FIG. 14 is a diagram showing the control flow of the edge information generation unit in the first embodiment.

FIG. 19 is a diagram showing an example of a document image.

FIG. 22 is a diagram showing a blank page detection result in the first embodiment.

FIG. 23 is a diagram showing a configuration of an ADF in a second embodiment.

FIG. 24 is a diagram showing a configuration of a region control unit in the second embodiment.

FIG. 27 is a diagram showing an example of an operation screen in a third embodiment.

DESCRIPTION OF THE EMBODIMENTS

Hereinafter, embodiments for carrying out the present invention will be described using the drawings. Firstly, however, a more detailed description of the problems solved by the present embodiment will be given with reference to the drawings.

Specific Example of Problems

Various types of paper are used for documents that are read by digital multifunction peripherals and the like, and noise due to the type of the paper, dust adhering to the paper or the like makes it difficult to perform blank page determination with highly precision. The types of paper used for documents include white paper, color paper that is pre-colored, and recycled paper containing many impurities. Noise caused by the quality of the scanner or the paper quality of the document occurs in image data obtained by reading documents printed on these types of paper. Noise includes contaminants such dust and dirt adhering to the read surface of documents and spatters of toner. Some of these contaminants are comparatively dark.

In Japanese Patent Laid-Open No. 2010-191941, a histogram of pixel values is created from the image data of the entire surface of the document, a background color is specified from the histogram, and it is determined whether the document is blank from the percentage of the frequency of the entire histogram that is occupied by frequencies other than the background color. This is in order to perform blank page detection by specifying the background color, without being affected by a base portion of the document. Also, smoothing or processing that does not count isolated points that are scattered is performed in order to reduce the influence of a noise, contaminants or the like.

Figure 17A:
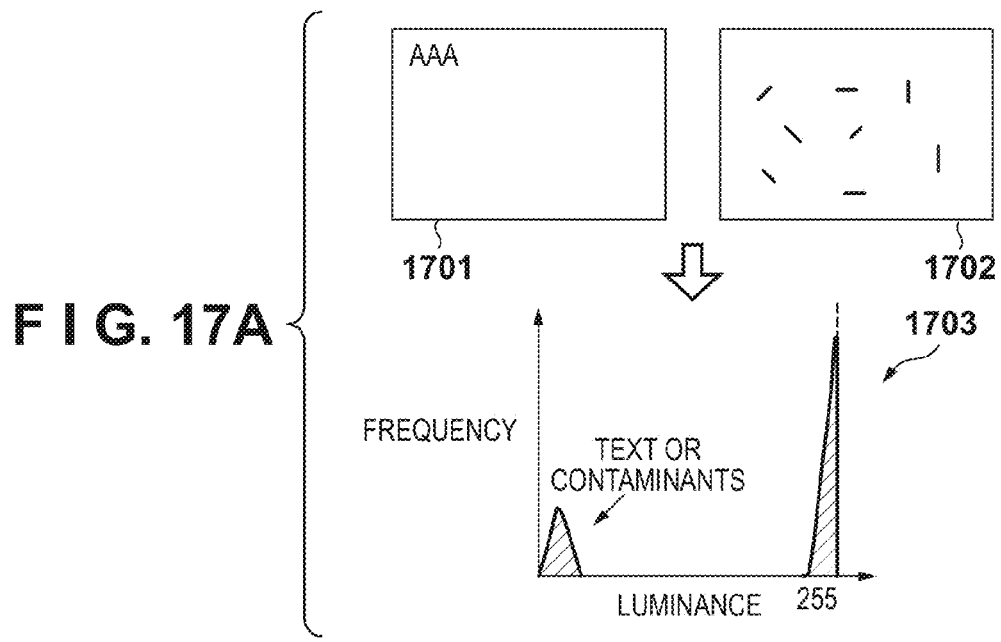
FIGS. 17A, 17B and 17C are diagrams showing examples of histograms.

The size of noise, contaminants and the like that are acquired as image data varies, and there are also contaminants that cannot be removed simply by performing smoothing or isolated point removal. These contaminants have a comparatively large area, and if they are counted in the histogram, it becomes difficult to distinguish a document having small amount of text. An example of this is shown by reference signs 1701 to 1703 in FIG. 17A. The image 1701 in FIG. 17A shows a document image in which a small amount of text is printed. The image 1702 in FIG. 17A shows a document image when the document is contaminated with dust, dirt or other contaminants. In the case where a histogram is generated from these document images, the histogram will take the form shown by the histogram 1703 of FIG. 17A. In other words, in the case where one histogram is generated from an entire image, it is difficult to discriminate a small amount of text from contaminants simply by the shape of the distribution thereof or the frequencies of portions having low luminance values.

Also, paper having a reduced thickness (thin paper) is another type of paper, and in the case where both sides of a document that is printed on one side are read, show-through may occurs in the image data of the side that is not printed. In the case where it is desired to detect the show-through side as a blank page, it is necessary to include the luminance values of the show-through in the range specified as the background color of the histogram. Although it is possible to detect the side of the document on which show-through occurs as a blank page, documents printed at the same level of density as the show-through will, on the other hand, also be detected as a blank page. An example of this is shown by images 1704 to 1705 in FIG. 17B.

Figure 17B:
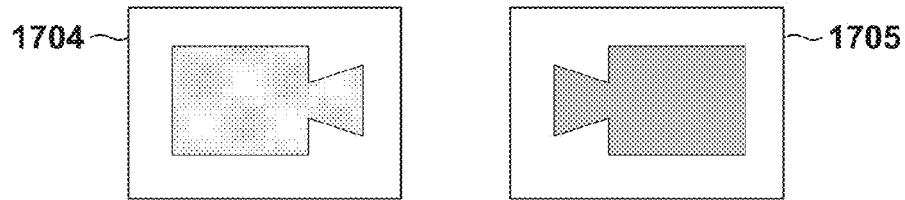
Figure 17C:
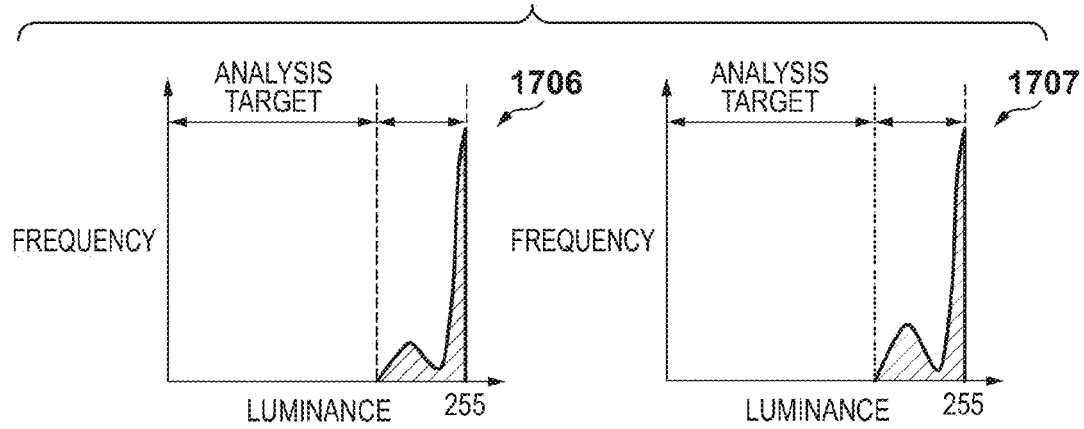

The image 1704 of FIG. 17B is a document image obtained by low density data being printed with halftone dots. The image 1705 of FIG. 17B is a document image obtained when a printed object shows through. A histogram 1706 of FIG. 17C is a histogram of the document image 1704. Also, a histogram 1707 in FIG. 17C is a histogram of the document image 1705. If image data that shows through is to be taken as a blank page, a specific range of luminance values need to be removed from analysis, as shown in the drawings. However, if the luminance values of show-through are removed from analysis, the luminance values of light printed objects will also be removed from analysis and the document will be detected as a blank page.

In Japanese Patent Laid-Open No. 2010-178377, edge extraction processing is performed, and the document is discriminated as being a plain document or a photographic document on photographic paper if the edge count is less than a predetermined threshold, and as a text document or a halftone dot document if the edge count is greater than or equal to the threshold. Since show-through that is included in image data is input after passing through the sheet, the edge strength is low, whereas a printed object that is printed at a low density is formed with halftone dots, and thus the edge strength is high. Therefore, it is possible to use edge information to distinguish show-through from printed objects that are printed at low density.

However, types of paper used for documents include paper that has many impurities such as recycled paper. Since many of these impurities have high edge strength, and they exist across the entire surface of the paper, the edge count detected for the entire surface of the document may be more than a normal printed object. In other words, in the case of wanting to detect paper such as recycled paper as a blank page, documents printed with a small amount of text or with halftone dots may be detected as a blank page. An example of this is shown in FIGS. 18A and 18B.

Figure 18A:
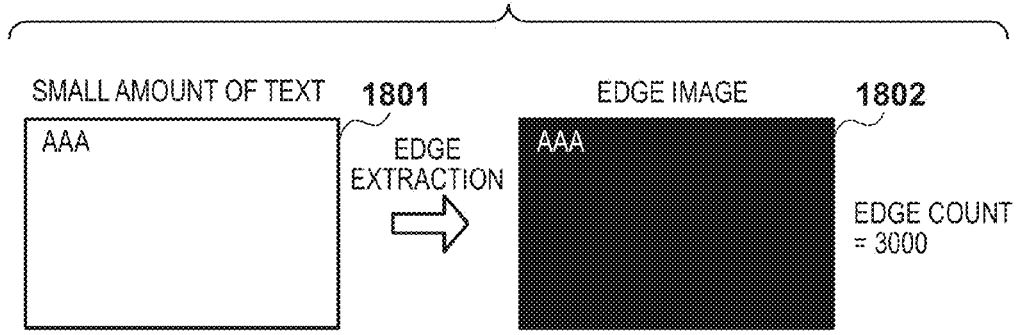
FIGS. 18A and 18B are diagrams showing examples of edge information.
Figure 18B:
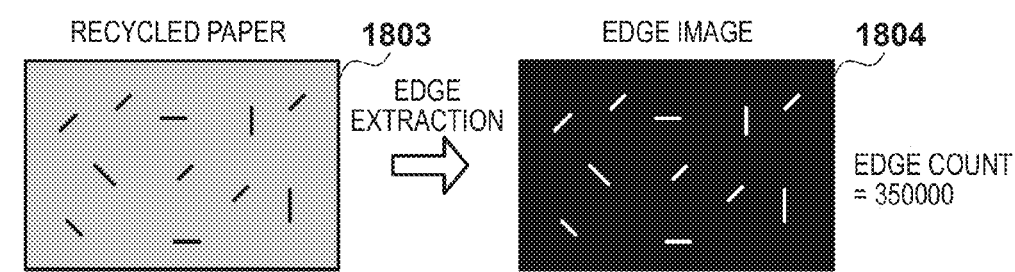

An image 1801 in FIG. 18A is a document image in which a small amount of text is printed. An image 1803 in FIG. 18B is a document image printed on recycled paper. An image 1802 in FIG. 18A is an image obtained by extracting edges from the document image 1801, with white being edges and black being non-edge portions. Also, an image 1804 in FIG.

18B is an image obtained by extracting edge information from the document image 1803. If the number of edges of a small amount of text is counted for the entire image, approximately 3000 edges are counted. On the other hand, if the number of edges of recycled paper is counted for the entire image, approximately 350000 edges are counted. In other words, in the case where recycled paper is detected as a blank page, a document with a small amount of text will also be detected as a blank page.

In the embodiments that are described below, the accuracy of blank page detection is improved by solving the above-mentioned specific problems.

Exemplary Document Images

Examples of document images common to each of the embodiments are shown in FIG. 19.

No. 1: Plain image on white paper
No. 2: Image with contaminants on white paper
No. 3: Image in which the text "ABC" is printed in black on white paper
No. 4: Plain image on pink paper
No. 5: Image in which the text "ABC" is printed in black on pink paper
No. 6: Image on recycled paper
No. 7: Image in which the text "ABC" is printed in black on recycled paper
No. 8: Image of a light halftone dot printed object on white paper
No. 9: Image due to show-through on white paper In FIG. 19, the numbers are shown in the left column, the exemplary document images are shown in the middle column, and whether or not the document image is blank or has content is shown in the right column. As shown in FIG. 19, a blank page refers to a document without print information (i.e., content). If there is no print information, both recycled paper and a color document such as color paper are treated as a blank page. That is, blank page detection is a determination as to whether content is printed on the document. Image data obtained when these are read and image data when only the show-through is read are also referred to as blank pages. On the other hand, documents with a small amount of text or documents on which light text is printed with halftone dots are not blank pages. That is, the images 1, 2, 4, 6 and 9 are treated as blank pages, and the images 3, 5, 7 and 8 are treated as paper including print information not as blank page. Image data obtained by reading a sheet containing print information that has been handwritten or printed with a printer is referred to as content data. Ideally, each document image in FIG. 19 should be determined as being the document image shown in the corresponding right column.

First Embodiment

Figure 1:
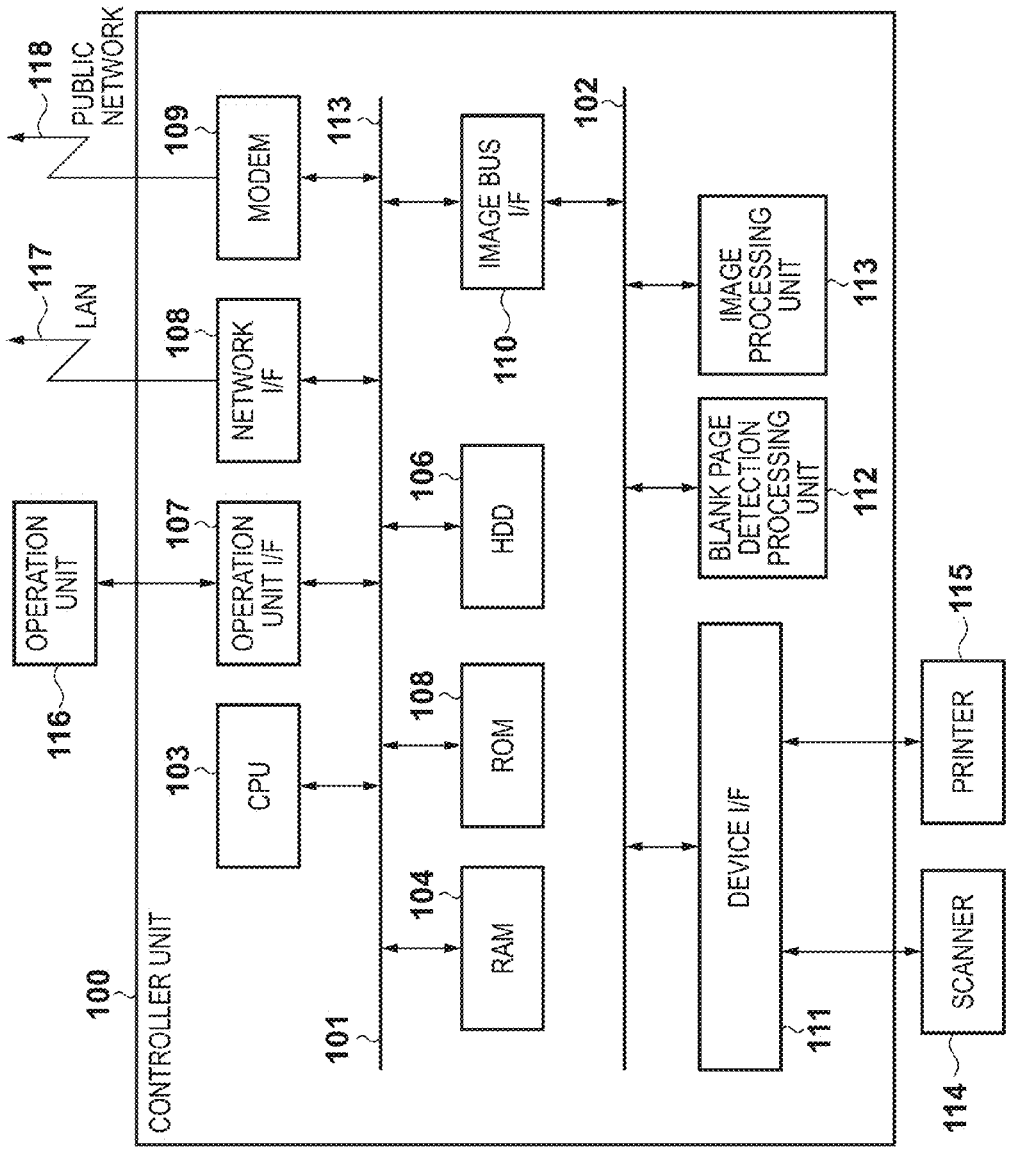
FIG. 1 is a diagram showing an overall system configuration.

FIG. 1 is a diagram showing a control system configuration of a digital multifunction peripheral that is an example of a preferred image processing apparatus for applying the present embodiment. A controller unit 100 is a controller connected to a scanner 114 that is an image input apparatus and a printer 115 that is an image output apparatus, and inputs and outputs image data and device information by being connected to a LAN 117 and/or a public network 118. A CPU 103 functions as a controller that controls the entire digital multifunction peripheral. A RAM (Random Access Memory) 104 is used as a temporary memory for control data or as a work memory under the control of the CPU 103. A ROM (Read Only Memory) 105 stores programs that are executed by the CPU 103. An HDD 106 is a hard disk drive that stores system software, image data, and the like. An operation unit I/F 107 is an interface unit with an operation unit 116 that outputs image data to be displayed on the operation unit 116 to the operation unit 116. Also, the operation unit I/F 107 functions to convey information input by a user from the operation unit 116 to the CPU 103. A network I/F 108 is connected to the LAN 117, and performs information input and output. A modem 109 is connected to the public network 118, and performs modulation and demodulation processing for data transmission and reception. The above configuration is disposed on a system bus 101. An image bus I/F 110 is a bus bridge that connects the system bus 101 to an image bus 102 that transfers image data at high speed, and converts the data structure. The image bus 102 is constituted by a PCI bus or a high speed bus such as an IEEE 1394 bus. A device I/F 111 connects the scanner 114 and the printer 115, which are image input/output devices, to the controller 100, and performs synchronous/asynchronous conversion of image data. A blank page detection processing unit 112 determines whether image data input by the scanner 114 is a blank page. An image processing unit 113 performs processing suitable for subsequent printing out or image transmission of image data input by the scanner 114, by correcting, manipulating and editing this image data. The image processing unit 113 also performs correction according to the printer, resolution conversion processing, and the like.

Image Input Unit (Scanner)

Figure 2A:
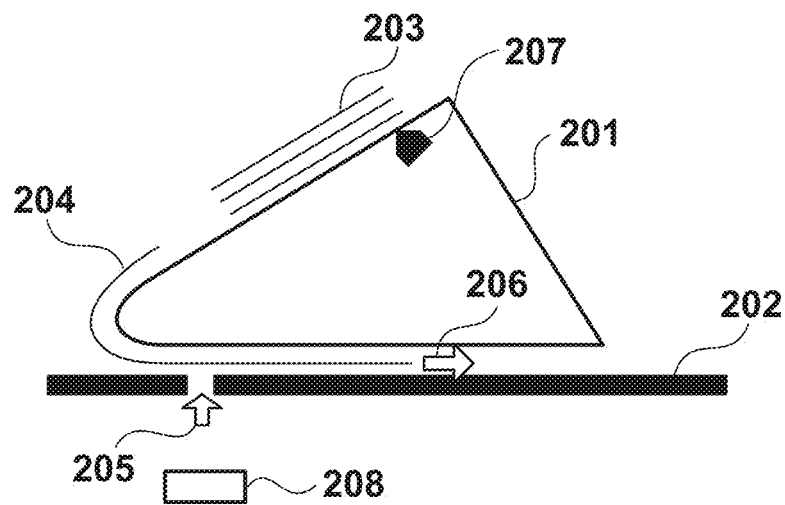
FIGS. 2A and 2B are diagrams showing a configuration of an ADF.
Figure 2B:
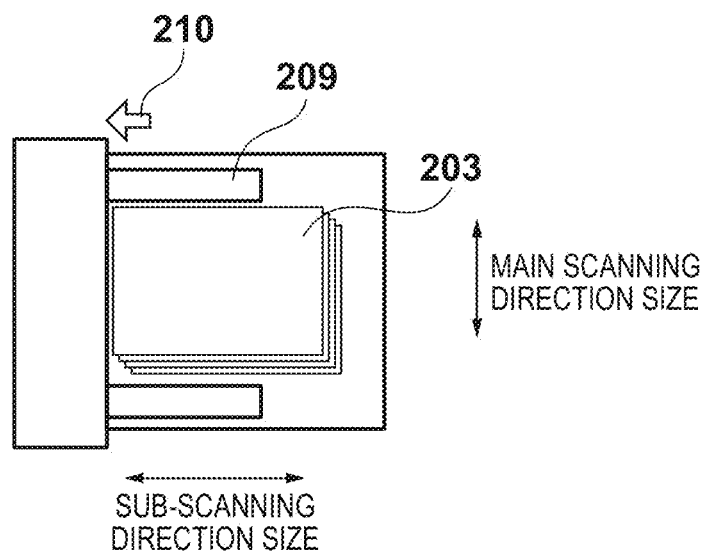

The configuration of an auto document feeder (ADF) 201 that is mounted in the scanner 114 is shown in FIG. 2A. A document glass platen 202 is a glass platen for placing a document constituted in the scanner 114. A documents 203 is bundle of documents set on a placement portion of the ADF 201. The uppermost document of the documents 203 is conveyed over the document glass platen 202 by a roller or the like that is not illustrated. A document 204 is a document that is being read, and is conveyed in the direction indicated by reference sign 206 in the diagram, by a document feeder constituted by a roller or the like in the ADF 201 that is not illustrated. The documents 203 is read by a reading device 208 in a reading position 205. The reading device 208 is constituted by a CCD, a CMOS or the like. A document size detection sensor 207 detects the size of the document image 203 in a conveyance direction, that is, a sub-scanning direction. The size in the sub-scanning direction will be discussed later. The sub-scanning direction size of the document image 203 detected by the document size detection sensor 207 is notified to the CPU 103. FIG. 2B is an overhead view from an upper portion of the ADF 201 shown in FIG. 2A. Note that, in FIG. 2B, the same reference signs are given to constituent elements that are the same as those shown in FIG. 2A. A document guide 209 is a document guide for aligning the width of the documents 203 loaded in the ADF 201, and also has a function of a document size detection sensor for detecting the document size of the documents 203 in the main scanning direction. The main scanning direction size of the documents 203 detected in the document guide 209 is notified to the CPU 103. Here, as shown in FIG. 2B, the size in the width direction relative to the conveyance direction 210 is defined as the main scanning direction document size, and the size in the lengthwise direction relative to the conveyance direction 210 is defined as the sub-scanning direction document size.

Blank Page Detection Processing Unit

Figure 3:
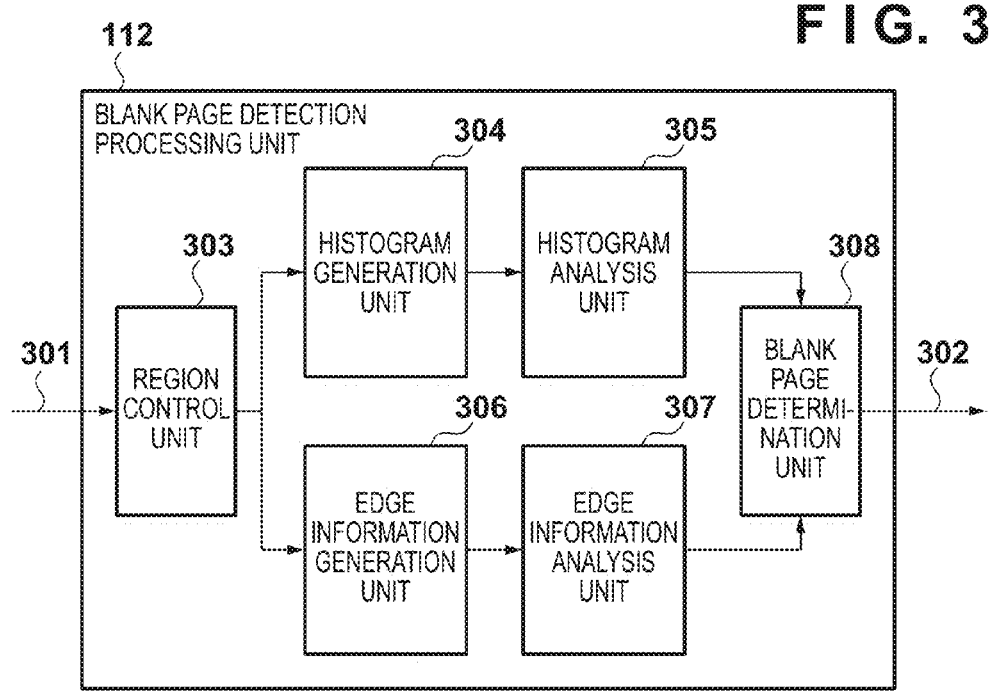
FIG. 3 is a diagram showing a configuration of a blank page detection processing unit.

FIG. 3 is a diagram showing an internal configuration of a blank page detection processing unit 112 in the present embodiment. A register that is not illustrated is connected to the blank page detection processing unit 112, and control parameters and processing results are held in the register. Writing to the register is performed by the CPU 103 and the blank page detection processing unit 112, and the blank page detection processing unit 112 reads the control parameters set in the register by the CPU 103, and operates in accordance with the control parameters. Digital image data 301 is digital image data obtained as a result of analog image data read by the ADF 201 being converted by an A/D converter that is not illustrated. Digital image data is, hereinafter, referred to as image data. An output signal 302 is the result output from the blank page detection processing unit 112, and is a signal representing whether image data is a blank page. A region control unit 303 controls the area of an image that serves as a target for generating a histogram of pixel values and edge information from input image data. In the reading of the document image 203 by the ADF 201, the leading edge, trailing edge, left edge and right edge of a document image depend on the conveyance configuration of the document image 203 and the light source configuration of the reading device 208, and there are cases where reading cannot be correctly performed and the shadow of the document is read. This situation is shown in FIG. 4.

Figure 4:
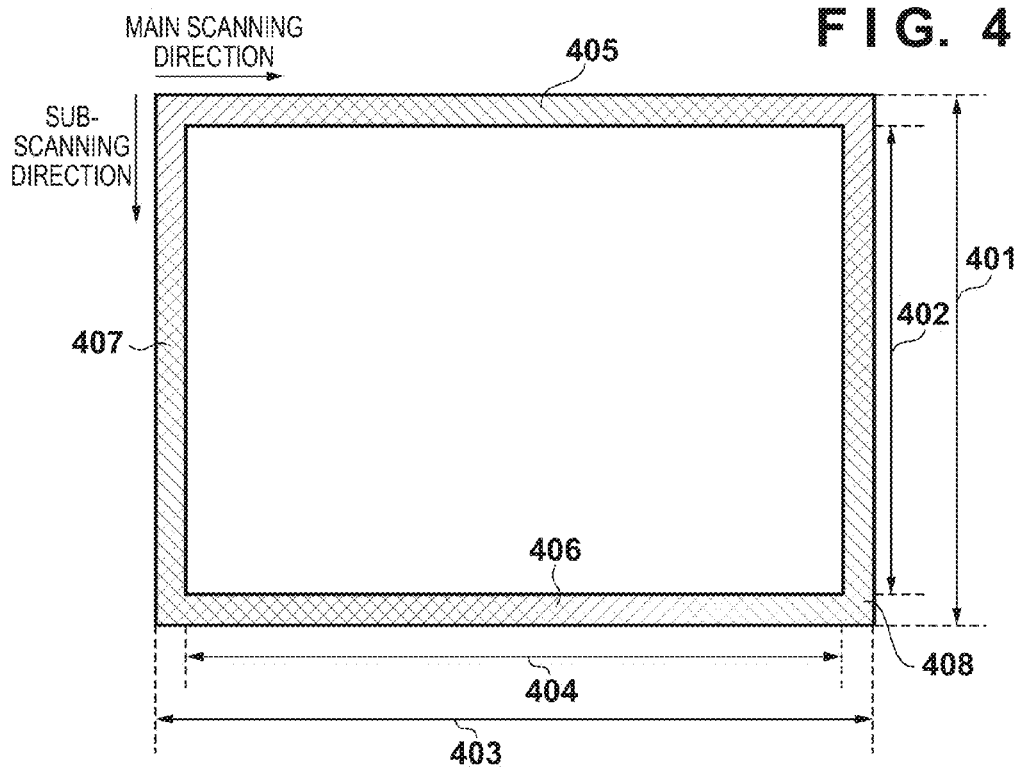
FIG. 4 is a diagram showing an example of effective and ineffective regions.

In FIG. 4, a sub-scanning direction pixel count 401 is the number of pixels in the sub-scanning direction of the document image, and a sub-scanning direction effective pixel count 402 is the number of pixels in the sub-scanning direction that are not affected by the shadow of the light sources at the leading edge and the trailing edge at the time of reading. A main scanning direction pixel count 403 is the number of pixels in the main scanning direction of the document image, and a main scanning direction effective pixel count 404 is the number of pixels in the main scanning direction that are not affected by shadow of the light source at the left edge and the right edge at the time of reading. Also, a leading edge shadow portion 405 is a shadow portion that occurs due to lighting at the leading edge when the document 203 is read, and a trailing edge shadow portion 406 is a similar shadow that occurs at the trailing edge portion. Also, a left edge shadow portion 407 is a shadow portion that occurs due to lighting at the left edge when the document 203 is read, and a right edge shadow portion 408 is a similar shadow portion that occurs at the right edge. Data of shadows that are generated due to the light sources are thus included in the leading edge portion, the trailing edge portion, the left edge portion and right edge portion, that is, the perimeter portion, of the image data read by the ADF 201.

Given that using values other than document image data in histogram generation and edge information generation inhibits accurate analysis, control that does not take information on this shadow portion is required. The region control unit 303 outputs a signal that sets the shadow portion as an ineffective region and sets portions other than the shadow as an effective region, in order to specify such a shadow portion and not perform histogram generation or edge information generation in downstream processing. For example, since data of the shadow is included in a region having a width of about 2 mm of the leading edge portion, the trailing edge portion and the left edge portion and the right edge portion in the case of reading an A4 size document, let this region is set as an ineffective region. It is also possible to perform control to adjust the width of this ineffective region so that regions where punch holes exist are set as ineffective regions. This will be discussed later in detail with reference to FIG. 5.

A histogram generation unit 304 is a histogram generation unit that generates a frequency distribution, that is, a histogram, of the pixel values of a plurality of regions of an image, and performs histogram generation using a effective/ineffective region signal 509 that is output by the region control unit 303, a region signal 510 showing a region within the effective region, and the image data 301. Note that a histogram of pixel values is referred to hereinafter in the present embodiment simply as a histogram. In the present embodiment, the first to ninth histograms are respectively generated for regions obtained by dividing the effective region of the image in nine. This will be discussed in detail later, with reference to FIG. 6, FIG. 7A, and FIG. 7B.

An edge information generation unit 306 counts the edge count of the plurality of regions. Edges are counted using the effective/ineffective region signal 509, the region signal 510 showing a region in the effective region, and the image data 301 that are output by the region control unit 303. In the present embodiment, first to ninth edge counts are counted for each of the nine region in which the effective region is divided. This will be discussed in detail later with reference to FIGS. 7A and 7B.

A histogram analysis unit 305 determines whether the document image 203 is a blank page based on the first to ninth histograms generated by the histogram generation unit 304. This will be discussed in detail later ith reference to FIGS. 8A and 8B.

An edge information analysis unit 307 determines whether the document image 203 is a blank page from the first to ninth edge counts generated by the edge information generation unit 306. This will be discussed in detail later with reference to FIG. 10.

A blank page determination unit 308 finally determines whether the document image 203 is a blank page from the determination signals of the histogram analysis unit 305 and the edge information analysis unit 307. That is, the histogram analysis unit 305 is assumed to be a first determination unit and the edge information analysis unit 307 is assumed to be a second determination unit, the blank page determination unit 308 can be called a third determination unit that ultimately determines whether or not there is content. The blank page determination unit 308 outputs a signal discriminating that the document image 203 is a blank page if the determination signal from the histogram analysis unit 305 indicates a blank page and the determination signal from the edge information analysis unit 307 is a blank page. The blank page determination unit 308 outputs a signal discriminating that the document has content if either one of the determination signals from the histogram analysis unit 305 and the edge information analysis unit 307 indicates content. Also, when blank page detection processing is completed, an end of blank page determination processing is notified to the CPU 103.

Figure 5:
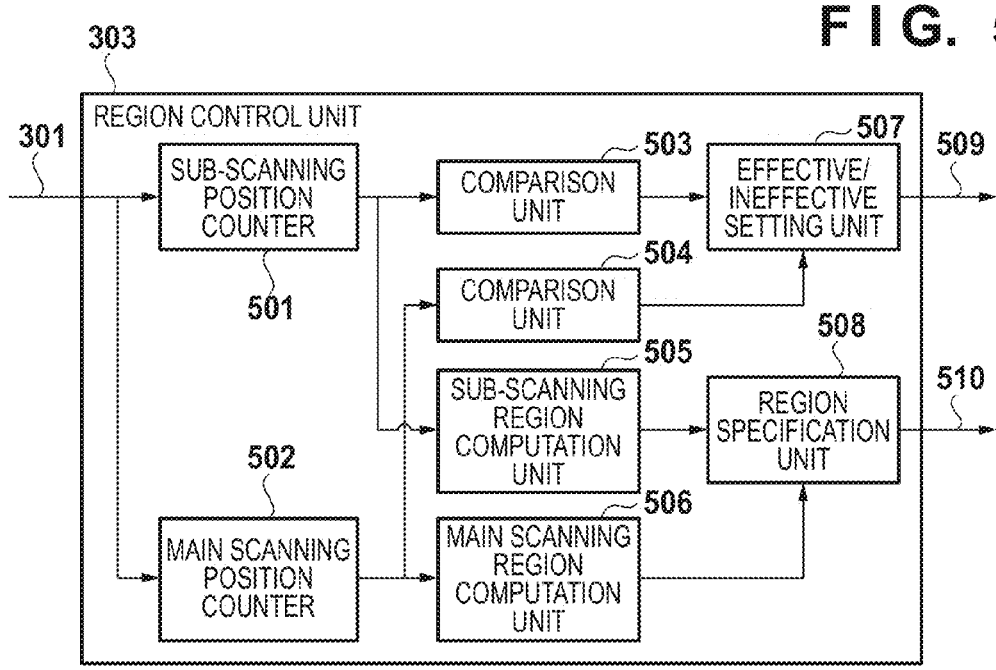
FIG. 5 is a diagram showing a configuration of a region control unit.

Region Control Unit 303 (FIG. 5)

A detailed configuration of the region control unit 303 is shown in FIG. 5. Note that, in FIG. 5, the same reference signs are given to constituent elements that are the same as FIG. 3.

A sub-scanning position counter 501 is constituted inside the region control unit, and counts the number of sub-scanning lines of the input image data. A main scanning position counter 502 is constituted inside the region control unit, and counts the number of the main scanning pixels of the input image data.

A first comparison unit 503 compares the count value of the sub-scanning position counter 501 with each leading edge effective position and trailing edge effective position stored in a register that is not illustrated, for example, and determines the sub-scanning region that is not affected by shadow, that is, the leading edge position (leading edge effective position) and trailing edge position (trailing edge effective position) of the sub-scanning effective region 402 in FIG. 4. The leading edge effective position is the pixel count of the leading edge shadow portion 405 shown in FIG. 4 referenced on the leading edge (upper edge of the diagram) of the document, and the trailing edge effective position is represented by a pixel count obtained by subtracting the pixel count of the trailing edge shadow portion 406 from the pixel count 401 of the document image in the sub-scanning direction shown in FIG. 4.

A second comparison unit 504 compares the count value of the main scanning position counter 502 with each left edge end effective position and right edge effective position stored in a register that is not illustrated, and determines The main scanning region that is not affected by shadow, that is, the main scanning effective region 404 shown in FIG. 4. The left edge effective position is the pixel count of the left edge shadow portion 407 referenced on the left edge shown in FIG. 4, and the right edge effective position is represented by a pixel count obtained by subtracting the pixel count of the right edge shadow portion 408 from the pixel count 403 in the document image main scanning direction shown in FIG. 4. The leading edge effective position, the trailing edge effective position, the left edge effective position and the right edge effective position are computed by the CPU 103 based on the document image sizes notified from the document size detection sensor 207 and the document guide 209, and set in the register.

The effective/ineffective setting unit 507 determines whether the pixel position is in an effective region or ineffective region of document image data, from the comparison results input from the first comparison unit 503 and second comparison unit 504. It is determined that the pixel position is in the effective region when the results input from the first comparison unit 503 and second comparison unit 504 are both signals indicating an effective region, and that the pixel position is in the ineffective region when one or both of the input results are signals indicating an ineffective region.

Next, the region control unit 303 further divides the main scanning effective region 404 and the sub-scanning effective region 402 into a plurality of regions. This is for the following reason. As mentioned above, in the case where a histogram is created from the entire image data, it may be difficult to discriminate between a document printed with a small amount of text and a document with contaminants such as dust or dirt. In view of this, control for dividing an image into a plurality of regions in order to implement appropriate discrimination, and creating a histogram for each region is needed.

Figure 20A:
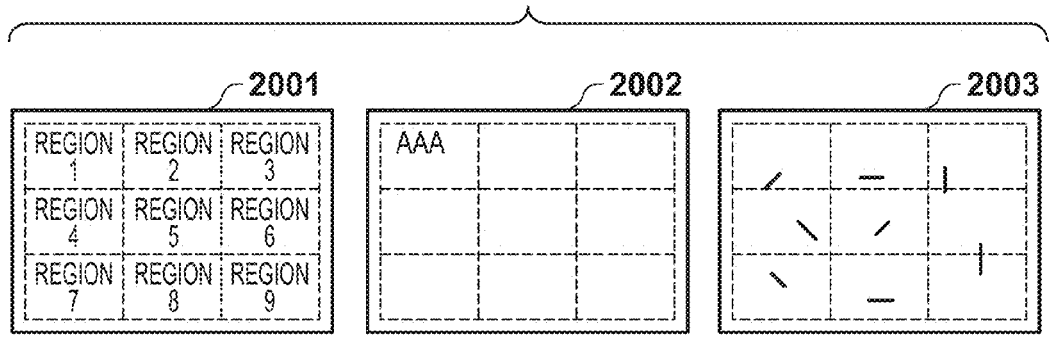
FIGS. 20A and 20B are diagrams showing an example of histogram generation for each region.
Figure 20B:
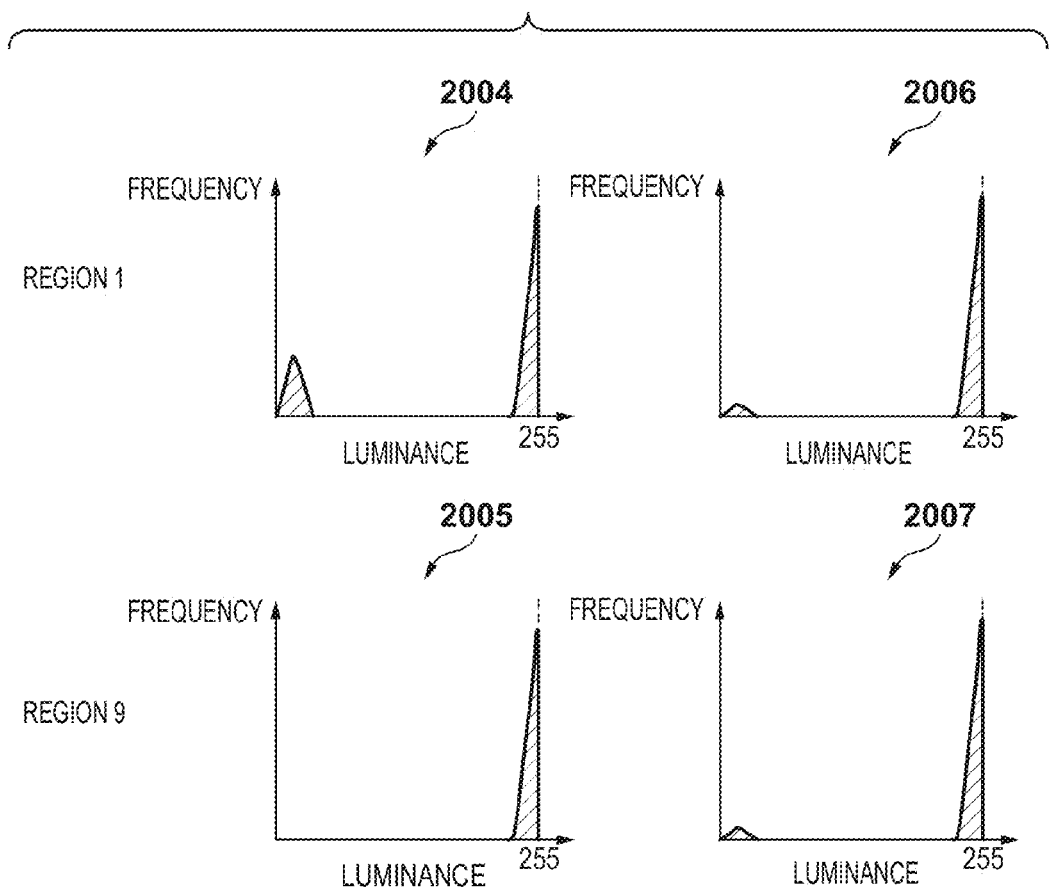

An example in which an image is divided into a plurality of regions and a histogram is generated is shown in FIGS. 20A and 20B. Regions 2001 of FIG. 20A show an example of when a document image is divided into a plurality of regions. In this example, the effective region of the document image is divided into 9 regions of 3 by 3. An image 2002 of FIG. 20A shows an example in which a document image 1701 shown in FIG. 17A in which a small amount of text is printed is divided into the regions 2001 of FIG. 20A. An image 2003 of FIG. 20A shows an example in which the document image 1702 shown in FIG. 17A in which dust or dirt is mixed is divided into the regions 2001 of FIG. 20A.

Examples of histograms generated for each region from the image 2002 are shown with a histogram 2004 and a histogram 2005 of FIG. 20B. In order to simplify the description, the histograms of the regions 2 to 8 are not illustrated. Since the text is included in region 1 of the image 2002, in the histogram 2004 of region 1, frequencies appear at low luminance values. On the other hand, frequencies at low luminance values do not appeared in the histogram 2005 of region 9. The high frequencies at high luminance values in both histograms show the background color of the documents.

On the other hand, examples of histograms generated for each region from the image 2003 are shown with a histogram 2006 and a histogram 2007 of FIG. 20B. The histograms of the regions 2 to 8 are also not illustrated here. Since dust is uniformly included in each region of the image 2003, minimal frequencies appeared at low luminance values in the histogram 2006 of region 1 that is shown, and the frequency distribution of the histogram 2007 of region 9 shows a similar tendency. In other words, histograms can be derived by dividing the image data into a plurality of regions, and local content can be distinguished from contaminants distributed throughout the entirety, based on the characteristics of the histogram for each region.

Also, as mentioned above, when edge information is used in order to distinguish a light printed object from show-through, a document image in which a small amount of text or a halftone dot printed object is included may be detected as a blank page in the case of wanting to detect recycled paper as a blank page. In order to appropriately implement this discrimination, it is necessary to perform control to divide the image into a plurality of regions and generate edge information for each region.

Figure 21A:
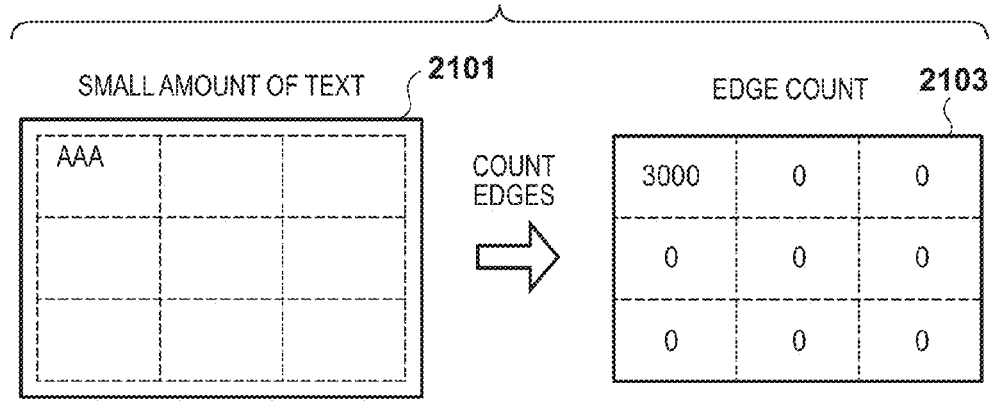
FIGS. 21A and 21B are diagrams showing an example of edge information generation for each region.
Figure 21B:
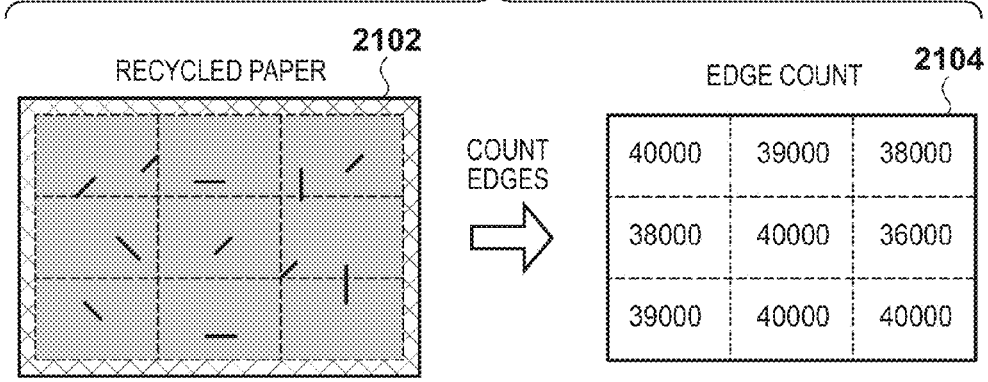

An example in which the image data is divided into a plurality of regions, and edge information is generated is shown in FIGS. 21A and 21B. The number of divided regions of the document is nine, similarly to the regions 2001 of FIG. 20A. An image 2101 of FIG. 21A shows an example in which a document image 1801 shown in FIG. 18A in which a small amount of text is printed is divided into nine regions of 3 by 3. An image 2102 of FIG. 21B shows an example in which a document image 1803 shown in FIG. 18B printed on recycled paper is divided into nine regions of 3 by 3. Exemplary results of counting edge information for each region from the image 2101 are shown in a table 2103 of FIG. 21A. Also, results of counting edge information for each region from the image 2102 is shown in table 2004 of FIG. 21B.

As shown in FIGS. 21A and 21B, the recycled paper includes more edges when viewed in units of regions. However, looking at the variance in the numbers of edges between regions, it is shown that only region 1 of the document in which a small amount of text is printed has a very large edge count, whereas recycled paper has little variance between regions and the numbers of edges are substantially the same. In other words, local content can be distinguished from the features of impurities distributed throughout the entirety by dividing image data into a plurality of regions.

The region control unit 303 divides an image into a plurality of regions in this way, and outputs the region signal 510 for discriminating which region the current position belongs to. An example of the method of dividing the effective region in the region control unit 303 will be described here using FIG. 6.

Figure 6:
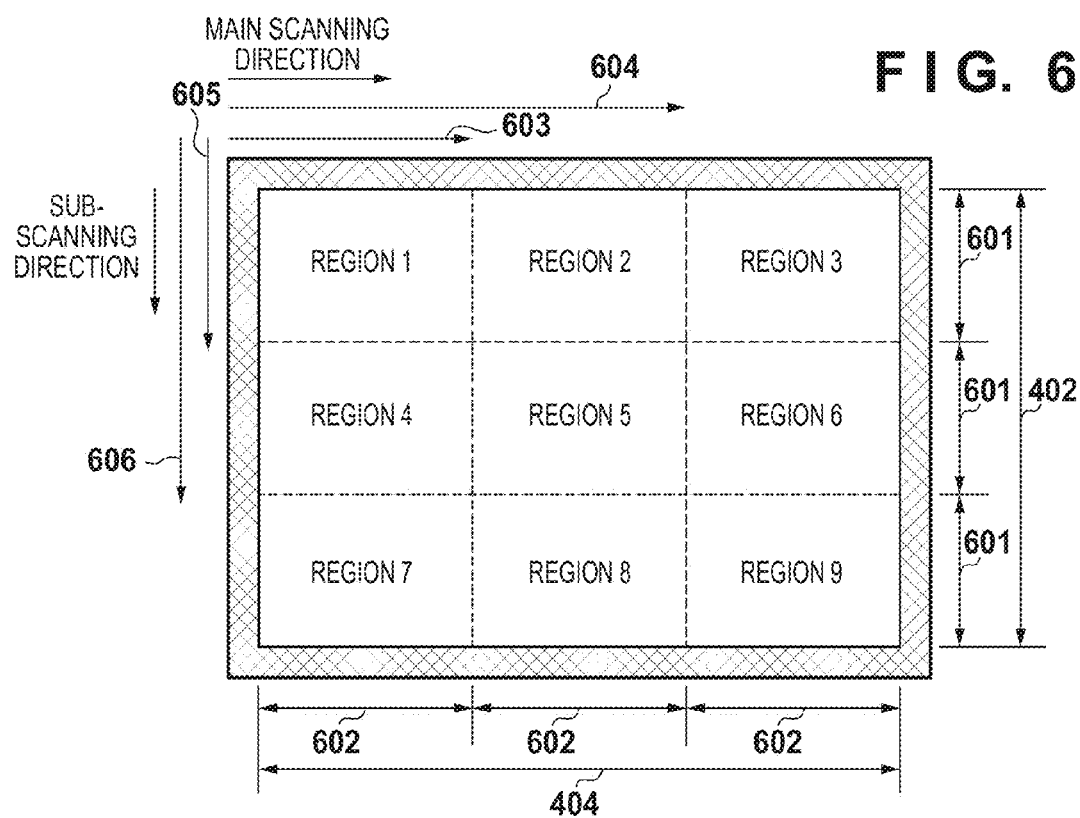
FIG. 6 is a diagram showing an example of region division.

FIG. 6 shows an example in which image data is divided into a plurality of regions having congruent shapes. In FIG. 6, the same reference signs are given to constituent elements that are the same as FIG. 4. As mentioned above, in order to compare the characteristics of the respective small regions, the small regions are desirably congruent in shape.

A sub-scanning direction length 601 indicates the pixel count in the sub-scanning direction of one region obtained by dividing image data (hereinafter, divided region). A pixel count that is one third of the sub-scanning direction length of the effective region obtained by subtracting the leading edge shadow portion 405 and the trailing edge shadow portion 406 from pixel count 401 of the document image in the sub-scanning direction shown in FIG. 4 is set as the sub-scanning direction length 601.

A main scanning direction length 602 indicates the pixel count of a divided region in the main scanning direction. A pixel count that is one third of the main scanning direction length of the effective region obtained by subtracting the left edge shadow portion 407 and the right edge shadow portion 408 from the pixel count 403 of the document image in the main scanning direction shown in FIG. 4 is set as the main scanning direction length 602.

A first dividing point 603 in the main scanning direction indicates the pixel count from the reference point of the document to the dividing point between the first divided region and the second divided region, that is, the position of the initial dividing point, in the main scanning direction. The first dividing point 603 in the main scanning direction is set to a value obtained by adding the main scanning direction length 602 of the divided regions to the left edge shadow portion 407 shown in FIG. 4.

A second dividing point 604 in the main scanning direction indicates the pixel count from the reference point of the document to the dividing point between the second divided region and the third divided region, that is, the position of the second dividing point, in the main scanning direction. The second dividing point 604 in the main scanning direction is set to a value obtained by adding two times the main scanning direction length 602 of a divided region to the left edge shadow portion 407 shown in FIG. 4.

A first dividing point 605 in the sub-scanning direction indicates the pixel count from the reference point of the document to the dividing point between the first divided region and the second divided region, that is, the position of the initial dividing point, in the sub-scanning direction. The first dividing point 605 in the sub-scanning direction is set to a value obtained by adding the sub-scanning direction length 601 of a divided region to the leading edge shadow portion 405 shown in FIG. 4.

A second dividing point 606 in the sub-scanning direction indicates the pixel count from the reference point of the document to the dividing point between the second divided region and the third divided region, that is, the position of the second dividing point, in the sub-scanning direction. The second dividing point 606 in the sub-scanning direction is set to a value obtained by adding two times the sub-scanning direction length 601 of a divided region to the leading edge shadow portion 405 shown in FIG. 4.

In order to divide the effective region of a document image into such small regions, dividing points are specified by a sub-scanning region computation unit 505 and a main scanning region computation unit 506.

The sub-scanning region computation unit 505 is a sub-scanning region computation unit that computes which divided region the current position of the region for processing belongs in the sub-scanning direction. In the sub-scanning region computation unit 505, for example, the sub-scanning position that is input from the sub-scanning position counter 501 is compared respectively with the value of the first dividing point 605 in the sub-scanning direction and the value of the second dividing point 606 in the sub-scanning direction that are set in advance in a register or the like. A value indicating that the current position, that is, the value of the sub-scanning position counter, is less than the first dividing point 605 in the sub-scanning direction, is greater than or equal to the first dividing point 605 in the sub-scanning direction and less than the second dividing point 606 in the sub-scanning direction, or is greater than or equal to the second dividing point 606 in the sub-scanning direction is then output, and input to a region specification unit 508. Note that, in this example, since the effective/ineffective setting unit 507 specifies the effective region, the sub-scanning region computation unit 505, with regard to the divided region at the end of the document image, determines which region the current position belongs to, without removing the ineffective region. This is because each determination result may possibly be used independently, and simply determining which divided region the current position only belongs to can be performed with the region specification unit 508 while also including the boundary position between the effective region and the ineffective region. Also, determining which divided region the boundary of each divided region is included in is not limited to the above example, and may be appropriately determined.

The main scanning region computation unit 506 is a main scanning region computation unit that computes which divided region the current position of the region for processing belongs to in the main scanning direction. In the main scanning region computation unit 506, for example, the main scanning position that is input from the main scanning position counter 502 is respectively compared with the value of the first dividing point 603 in the main scanning direction and the value of the second dividing point 604 in the main scanning direction that are set in advance in a register or the like. A signal indicating that the current position, that is, the value of the main scanning position counter, is less than the first dividing point 603 in the main scanning direction, greater than or equal to the first dividing point 603 in the main scanning direction and less than the second dividing point 604 in the main scanning direction, or greater than or equal to the second dividing point 604 in the main scanning direction is then output, and input to the region specification unit 507. Note that the region specification unit 508 is able to determine the effective region, similarly to the determination in the sub-scanning direction. Also, determining which divided region the boundary of each divided region is included is not limited to the above example, and may be appropriately determined.

The region specification unit 508 is a region specification unit that specifies which of regions 1 to 9 shown in FIG. 6 the current pixel position belongs to. Here, the region specification unit 508 determines which of regions 1 to 9 the current position belongs to, based on the values input from the sub-scanning region computation unit 505 and the main scanning region computation unit 506, and outputs the region signal 510 indicating the region which the current position belongs to.

Figure 7A:
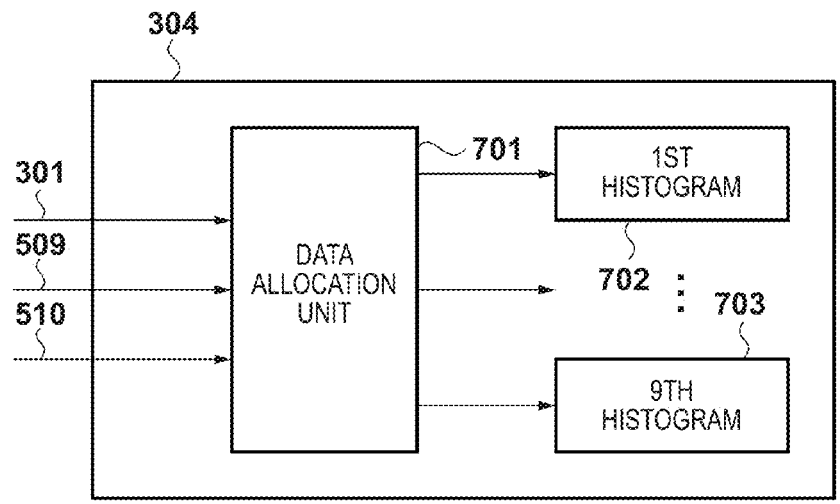
FIGS. 7A and 7B are diagrams showing configurations of a histogram generation unit and an edge information generation unit.

Histogram Generation Unit 304 (FIG. 7A)

The internal configuration of the histogram generation unit 304 is shown in FIG. 7A. A data allocation unit 701 is a data allocation unit that reflects the frequencies of pixel values in the histogram of each divided region generated downstream, according to the image data 301, the effective/ineffective region signal 509, and the region signal 510. In each histogram, the allocated frequencies corresponding to the pixel values of the image data are added together. Note that since the image data 301 and the effective/ineffective region signal 509 need to be synchronized with the region signal 510, the image data 301 is also delayed according to signal delays in the region control unit or the like, although this is omitted for convenience of description. Here, in the case where the effective/ineffective region signal 509 indicates an ineffective region, the image data is not output downstream. In the case of generating histograms with 32 gray levels (5 bit) relative to the bit precision (i.e., 8 bit) of the image data 301, the data allocation unit 701 also has a function of outputting 5-bit image data after removing the lower 3 bits downstream. That is, the data allocation unit 701 has a function of quantizing input image data and reflecting the quantized input image data in the frequency distribution. Illustration of the second to eighth histograms is omitted in order to simplify description, and only a first histogram 702 and a ninth histogram 703 are shown in FIG. 7A.

Figure 7B:
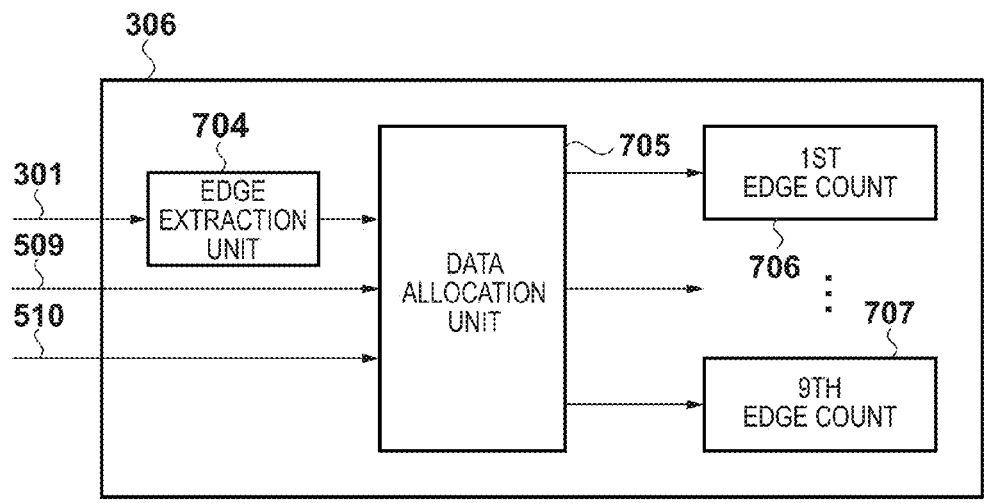

Edge Information Generation Unit 306 (FIG. 7B)

The internal configuration of the edge information generation unit 306 is shown in FIG. 7B. An edge extraction unit 704 extracts edges from the image data 301. Here, convolution is performed using a 7×7 matrix, and an edge portion is output downstream if the output is greater than or equal to a threshold, and a non-edge portion is output downstream if the output is less than the threshold. The threshold and the coefficients of the 7×7 matrix that are used are assumed to be read from a register that is not illustrated. A data allocation unit 705 reflects the edge signal output from the edge extraction unit 704 in the downstream edge count, according to the effective/ineffective region signal 509 and the region signal 510. That is, if the edge signal indicates an edge, a signal is output to the edge count of the divided region specified by the effective/ineffective region signal 509 and the region signal 510, and 1 is thereby added to the edge count of the corresponding divided region. Here, if the effective/ineffective region signal indicates an ineffective region, the image data is not output downstream. Illustration of the second to eighth edges is omitted in order to simplify description, and a first edge count 706 and a ninth edge count 707 are shown in FIGS. 7A and 7B.

Histogram Analysis Unit 305 (FIG. 8A, FIG. 8B)

In FIG. 8A, an average value computation unit 801 computes the first to ninth average values 808 respectively from the first to ninth histograms 806 generated by the histogram generation unit 304. The histogram 806 is constituted by values indicating regions, values indicating luminance values, and values indicating the frequency of each luminance value, for example.

Also, luminance values can be acquired by taking only G signals of the RGB data of the read image data. Note that the method of acquiring luminance values is not limited to this method, and luminance values may also be acquired by another method. The first to ninth average values 808 are the average pixel values of each divided region. A variance value computation unit 802 computes the variance of the pixel values in each of the first to ninth divided regions from the first to ninth histograms generated by the histogram generation unit 304 and the first to ninth average values computed by the average value computation unit 801.

A detailed configuration of the variance value computation unit 802 is shown in FIG. 8B. A gamma correction unit 809 performs gamma correction on histograms. As mentioned above, color paper or the like may be used for the documents 203 apart from white paper. Since a base portion of the optically read image data may contain noise due to the optical characteristics of the scanner or paper quality, this noise affects downstream analysis processing. In view of this, the gamma correction unit 809 performs correction processing to the histograms. The gamma correction unit 809 computes a luminance value correction table shown in FIG. 9A, and corrects input luminance values. Also, in the case of wanting to attach weight to luminance values at the low end, correction such as shown in FIG. 9B can be performed. Which table to create can be determined, for example, by being designated in advance by an operator, or the like.

Figure 9A:
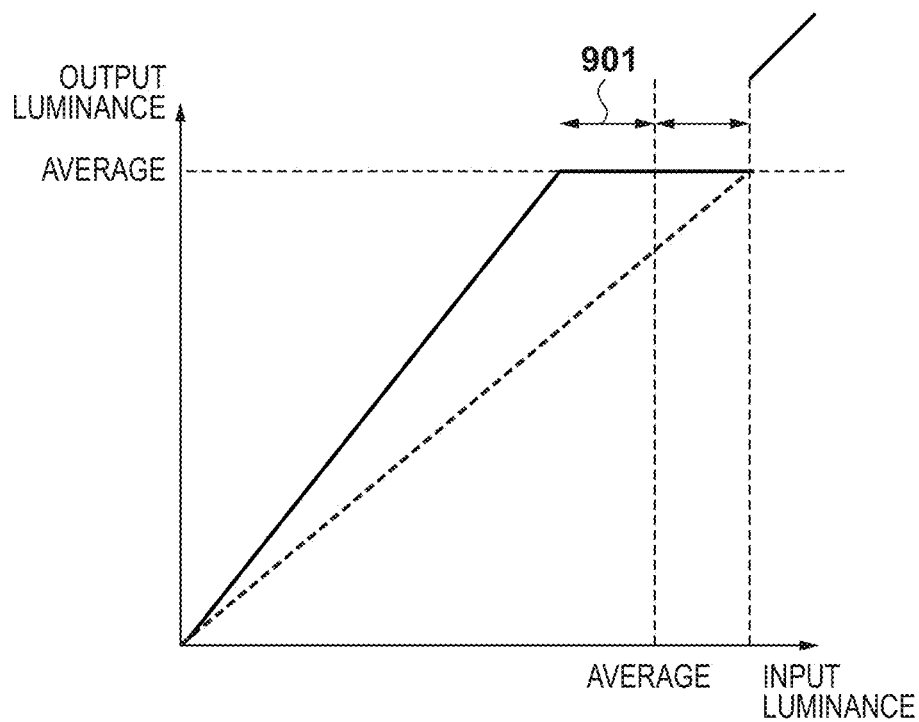
FIGS. 9A and 9B are diagrams showing an example of histogram correction.
Figure 9B:
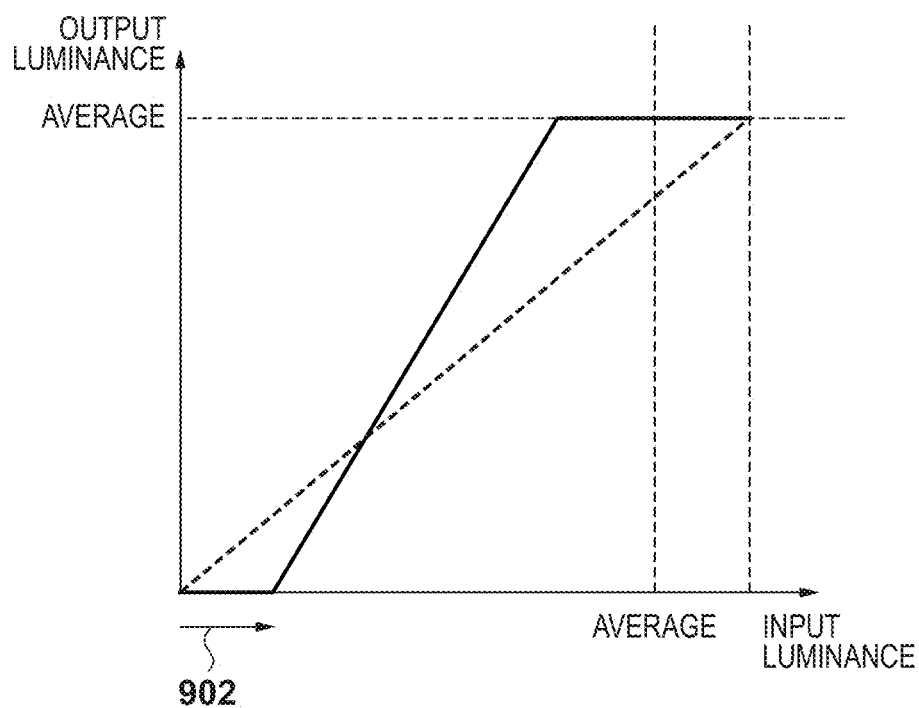

Calculation of the luminance value correction table shown in FIG. 9A is performed with the following procedures.

1. Map the input values of a ±average value vicinity range 901 in a vicinity of the average value to the average value. Note that the average value vicinity range 901 is decided in advance.

2. Derive slope a by (average value−average value vicinity range)/avg. value, and compute table mapping range from 0 to (avg. value−predetermined range) from the equation y=ax. That is, from the origin to (avg. value−avg. value vicinity range) is linearly mapped.

3. Luminance values greater than or equal to (avg. value+avg. value vicinity range) are directly used as input luminance values. Note that in order to maintain the continuity of the output values of avg. value+avg. value vicinity range, the mapping function of this range may be given as y−average value=(max. value−avg. value)/(max. value−avg. value+avg. value vicinity range)) (x−(avg. value+avg. value vicinity range)).

In the case of computing the luminance value correction table shown in FIG. 9B, the following procedures are performed.

1. Map a ±average value vicinity range 901 in the vicinity of the average value as average value luminance values. The average value vicinity range is decided in advance.

2. Derive slope a by (avg. value−avg. value vicinity range−low luminance value range)/avg. value. The low luminance range is decided in advance.

3. From the two points (avg. value−avg. value vicinity range, average value) and (low luminance value range, 0), derive a y-intercept b of a straight line that connects these two points, and compute a mapping table from the low luminance value range to (avg. value−avg. value vicinity range) from the equation y=ax+b. At this time, the output luminance value, if negative (−1 or less), is computed as an output luminance value 0.

4. Luminance values greater than or equal to "avg. value+avg. value vicinity range" are directly used as input luminance values. Note that in order to maintain the continuity of the output values in the avg. value+avg. value vicinity range, the mapping function of this range may be given as y−average value=(max. value−average value)/(avg. value+maximum value−avg. value))(x−(avg. value+avg. value vicinity range)).

The gamma correction unit 809 performs gamma correction on input pixel values, using a gamma correction table created on the basis of the histogram and average values for each divided region as mentioned above, and outputs the corrected input pixel values. Note that because a gamma correction table can be determined if there are average values, the table is generated by inputting average values prior to gamma correction, and thereafter performing correction. This gamma correction can also be said to be processing for converting pixel values in a predetermined range from the average value to the average value.

A difference computation unit 810 receives average values 808 that are output from the average value computation unit 801 and output luminance values that are output from the gamma correction unit 809 and histograms 806, and computes the difference from the average values. Here, the difference value is computed from (avg. value−luminance value)×(avg. value−luminance value)×frequency. Note that the output luminance values and the histograms 806 that are input are synchronized, and the frequencies of the output luminance values from the gamma correction unit 809 is shown by the histogram 806.

A cumulative addition unit 811 performs cumulative addition of difference values to a total luminance value. A division unit 812 divides the cumulative additional value by the total frequency. A variance value 813 of luminance values of each region is computed by the processing of the division unit 812. For example, the variance value is high if there is some sort of a printed object, and the variance value is low if only the background color.

In any case, the variance value computation unit 802 derives the variance based on the frequency distribution of average values before gamma correction and pixel values after gamma correction.

An average value determination unit 803 compares, for each divided region, the average value of the divided region computed by the average value computation unit 801 with a threshold, and discriminates whether the divided region is covered by a dark printed object (i.e., dark portion of a photograph). Here, the average value determination unit 803 outputs a determination signal indicating blank page if the average luminance value of each region is greater than or equal to the threshold, and outputs a determination signal indicating content if less than the threshold. The average value computation unit 803 performs determination with respect to the first to ninth regions.

The variance value determination unit 804 compares, for each divided region, the variance value 813 of the divided region computed by the variance value computation unit 802 with a threshold, and determines the variance in the luminance values of each divided region. Here, the variance value determination unit 804 judges that a printed object exists if the variance value is greater than the threshold since there is a large variance in luminance and outputs a signal indicting content, and judges that there is only the base if the variance value is less than the threshold since there is a small variance in luminance and outputs a determination signal indicating blank page. A variance value determination unit 804 performs determination with respect to each of the first to ninth regions.

A histogram determination unit 805 determines whether the document image 203 is a blank page from the determination signal of the average value determination unit 803 and the determination signal of the variance value determination unit 804. Here, the histogram determination unit 805 outputs a determination signal 807 indicating that the blank page determination result of the document is blank page, if all of the determination signals of the average value determination unit 803 and the variance value determination unit 804 for each of the first to ninth divided region indicate blank page. The histogram determination unit 805 outputs a determination signal 807 indicating that the blank page determination result of the document indicates content, if the signal of at least one divided region indicates content.

Here, the result is discriminated to indicate content if the signal of even one region indicates content. However, for example, threshold processing may be performed with respect to the number of regions in which the blank page determination result is discriminated to be content, and a signal discriminating that the result is discriminated to be content may be output if the number of regions in which the blank page determination result is discriminated to be content is greater than or equal to a predetermined number of regions. Detailed operation control by the histogram analysis unit 305 will be discussed later using another diagram.

Figure 10:
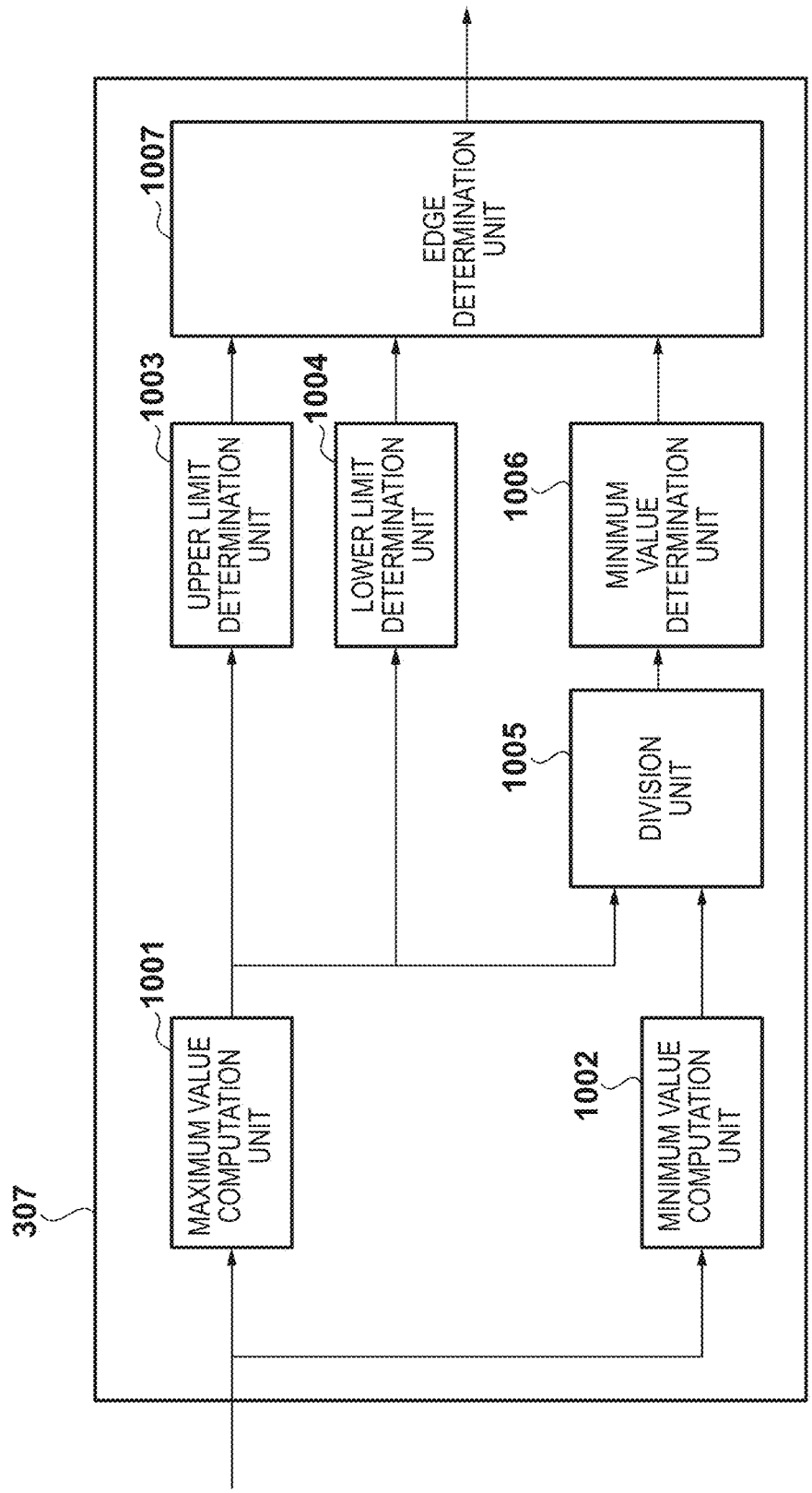
FIG. 10 is a diagram showing a configuration of an edge information analysis unit.

Edge Information Analysis Unit 307 (FIG. 10)

The internal configuration of the edge information analysis unit 307 is shown in FIG. 10. A maximum value computation unit 1001 obtains the maximum edge count from the first to ninth edge counts generated by the edge information generation unit 307. A minimum value computation unit 1002 obtains the minimum edge count from the first to ninth edge counts generated by the edge information generation unit 307. An upper limit determination unit 1003 performs threshold processing with respect to the maximum edge count obtained by the maximum value computation unit 1001, and outputs a determination signal indicating whether the image data is a blank page. Here, a signal indicating content if the edge count is greater or equal to a threshold and blank page if less than the threshold is output as the determination signal. For example, in the case of a digital multifunction peripheral or the like, security dots or the like are sometimes printed with the aim of restricting copies of something that has been printed, or the like. The printing may be all over the entire document surface, in which case, the same number of edges may be counted in all of the regions when comparing the edge distribution between regions downstream, and the image data may be discriminated as being a blank page. In other words, it is necessary to discriminate the image data as content if the edge count is over a predetermined edge count. In this processing, an edge count of approximately 150,000 edges is given as the threshold.

A lower limit determination unit 1004 performs threshold processing with respect to the maximum edge count obtained by the maximum value computation unit 1001, and outputs a determination signal indicating blank page if the maximum edge count is less than a threshold. Here, the lower limit determination unit 1004 outputs a determination signal that discriminates the image data as being a content candidate if the maximum edge count is greater than or equal to a threshold, and as being a blank page if the maximum edge count is less than the threshold. For example, in the case of high quality paper such as coated paper, hardly any edge may be extracted. In other words, when a comparison is performed with a relative value between regions in the case where the edge count is 10 in one region and 0 in another region, 0/10=0 is computed, giving the smallest correlation value, and image data may be discriminated as content. Here, a low correlation value indicates here that the difference in edge counts between regions is large. For example, in the case where the maximum edge count is 320 and the minimum edge is 300, 300/320=0.93 is computed, and the correlation value is high. In other words, it is necessary to discriminate the image data as a blank page if the edge count is less than a predetermined edge count in each region. In this processing, a threshold of approximately 400 edges is set. This is the edge count extracted in the case where a common white paper is used.

A division unit 1005 performs division processing with the maximum edge count computed by the maximum value computation unit 1001 and the minimum edge count computed by the minimum value computation unit 1002, and computes the correlation value between regions. Here, the correlation value is computed by min. edge count/max. edge count.

A minimum value determination unit 1006 outputs a determination signal indicating whether the image data is a blank page based on the correlation value computed by the division unit 1005. Here, the minimum value determination unit 1006 compares the correlation value computed by the division unit 1005 with a threshold, and discriminates that the image data is a blank page if the correlation value is greater than or equal to the threshold and that the image data is content if the correlation value is less than the threshold. In other words, the minimum value determination unit 1006 discriminates that the image data is a blank page if the correlation value is high since the difference between the maximum edge count and the minimum edge count is small, and that the image data is content if the correlation value is low since the difference between the maximum edge count and the minimum edge count is large.

An edge determination unit 1007 determines whether the image data is a blank page based on the determination signal of the upper limit determination unit 1003, the determination signal of the lower limit determination unit 1004, and the determination signal of the minimum value determination unit 1006. Here, in the case where the determination signal of the upper limit determination unit 1003 indicates content, the edge determination unit 1007 outputs a determination signal indicating that the image data is discriminated as being content, without referring to the determination signals of the lower limit determination unit 1004 and the minimum value determination unit 1006. Also, in the case where the determination signal of the upper limit determination unit 1003 indicates blank page candidate and the determination signal of the lower limit determination unit 1004 indicates blank page, the edge determination unit 1007 outputs a determination signal indicating that the image data is discriminated as being a blank page, without referring the determination signal of the minimum value determination unit 1006. Also, in the case where the determination signal of the upper limit determination unit 1003 indicates blank page candidate and the determination signal of the lower limit determination unit 1004 indicates content candidate, the edge determination unit 1007 outputs the determination signal of the minimum value determination unit 1006. Detailed operation control by the edge information analysis unit 307 will be discussed later using another diagram.

Figure 11A:
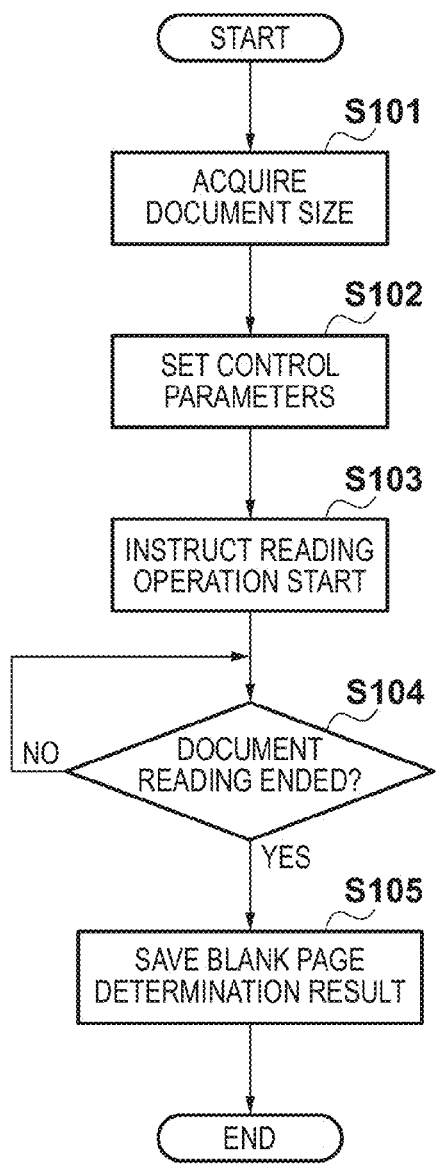
FIGS. 11A and 11B are diagrams showing the control flow of a CPU 103 in a first embodiment.

Image Reading Control Flow (FIG. 11A)

Next, control by the CPU 103 and the blank page detection processing unit 112 will be described. FIG. 11A is a diagram showing the control flow of the CPU 103 for controlling operations at the time of reading by the digital multifunction peripheral when using the blank page detection processing unit 112.

The CPU 103 acquires the document size of the document image 203 set in the ADF 201 from a sensor for detecting size when the digital multifunction peripheral of the present embodiment is started (step S101). The CPU 103 sets various parameters to be used by the blank page detection processing unit 112 and region division positions based on the document size acquired at step S101 (step S102). That is, positions that divide the horizontal and vertical lengths of the effective region of the document equally are set as region division positions. Parameters are, for example, set for use in the abovementioned processing by the region control unit 303, the histogram generation unit 304, the histogram analysis unit 305, the edge information generation unit 306, the edge information analysis unit 307 and the like constituting the blank page detection processing unit 112. The CPU 103 gives a reading operation start instruction when the above setting has been completed at step S102 (step S103). In response to the reading operation start instruction, reading of the document image by the scanner 114 is started via the device I/F 111, and the image processing unit 113, the blank page detection unit 112 and the like also perform operations for processing the read image data. Meanwhile, the CPU 103 waits for notification that reading of the document image data 203 has been completed (step S104). In the case where reading completion notification is received at step S104, the blank page determination result is saved to the HDD 106 in association with the image data, and control is ended (step S105). In the present embodiment, the blank page determination result is associated with the image data by holding the processing result in a header portion of the image data, but database management may be performed and the processing result may be held in a database, for example.

Figure 11B:
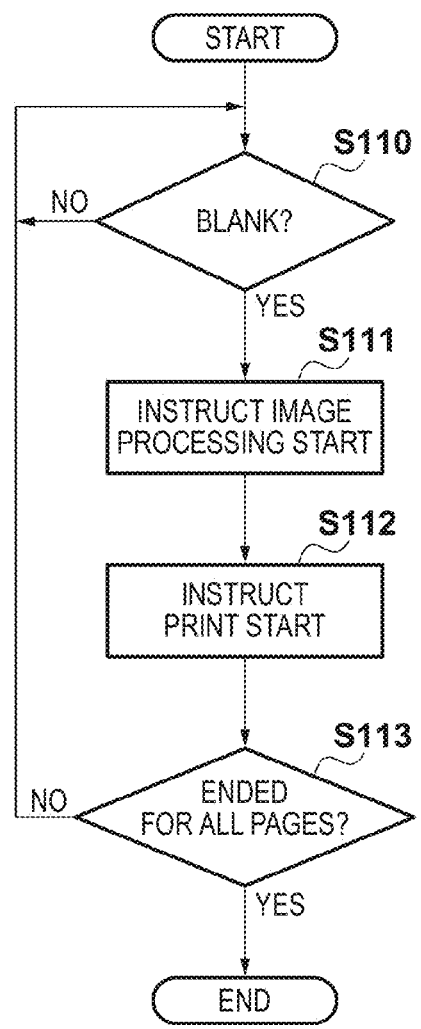

Image Output Control Flow (FIG. 11B)

FIG. 11B is a diagram showing the control flow of the CPU 103 for controlling operations at the time of output by the digital multifunction peripheral when using the blank page detection processing unit 112.

The CPU 103 acquires image data and the blank page detection result from the HDD 106 when the digital multifunction peripheral of the present embodiment is started, and does not give an image processing start instruction if the blank page detection result indicates a blank page (if determined to be Yes at step S110). The processing advances to step S111 if the blank page detection result indicates content (if determined to be No at step S110), and the CPU 103 transmits the image data to the image processing unit 113, and gives an image processing start instruction (step S111). Next, the CPU 103 transmits image data that has been processed by the image processing unit 113 to the printer 115, and gives a print start instruction to the printer 115 (step S112). The CPU 103 then repeats the processing of the above steps S110 to S112 until all pages have been printed (step S113).

Figure 12:
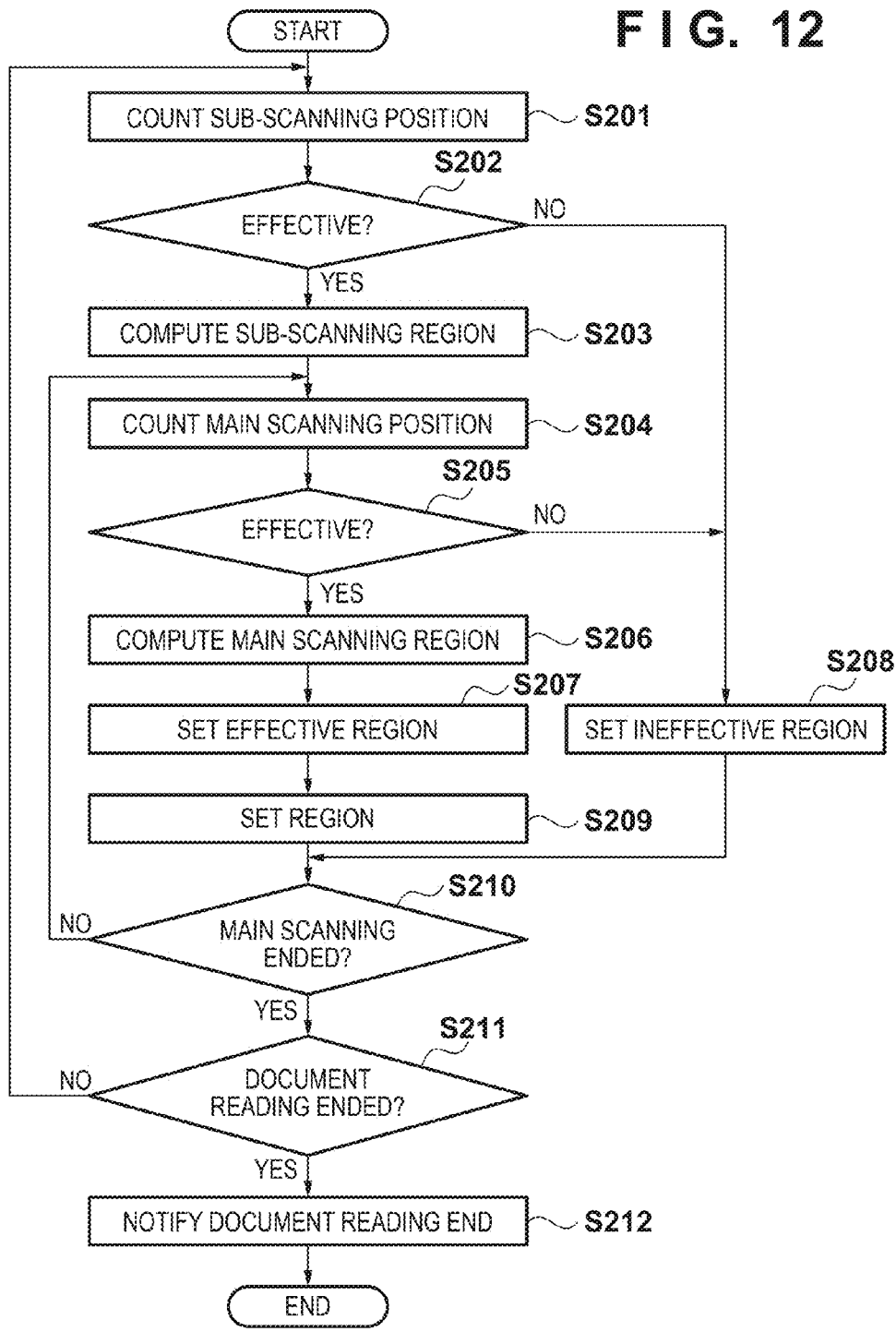
FIG. 12 is a diagram showing the control flow of the region control unit in the first embodiment.

Control Flow of Region Control Unit 303 (FIG. 12)

Next, the operation flow of the region control unit 303 in the blank page detection processing unit 112 when document reading control is performed by the CPU 103 shown in FIG. 11A will be described. FIG. 12 is a diagram showing the control flow of the region control unit 303. The reading device 208 starts reading of the document image 203 when an instruction to start reading the document image 203 is given under the control of the CPU 103 at step S103. The image data read by the reading device 208 is converted to digital values by an A/D conversion unit that is not illustrated, and output to the region control unit 303. The image data is read one pixel at a time in raster order, and a main scanning synchronization signal indicating the position of a pixel of the image data in the main scanning direction, and a sub-scanning synchronization signal indicating the position of a line in the sub-scanning direction are input to the region control unit 303. The control of FIG. 12 synchronizes the main scanning synchronization signal and the sub-scanning synchronization signal, and the control of the loop of S204 to S210 is executed with one pulse of the main scanning synchronization signal, and the control of the loop of S201 to S211 is performed with one pulse of the sub-scanning synchronization signal.

When image data is input, the sub-scanning position counter 501 counts the position of the input image data in the sub-scanning direction (step S201). If the value counted in step S201, that is, the current position, is within the sub-scanning direction effective region (Yes at step S202), the sub-scanning region computation unit 505 computes the sub-scanning region (step S203). If the value counted in step S201 is outside the sub-scanning direction effective region (No at step S202), the effective/ineffective setting unit 507 outputs the effective/ineffective region signal 509 as an ineffective signal (step S208).

When image data is input, the main scanning position counter 502 counts the position of the input image data in the main scanning direction (step S204). If the value counted in step S204 is within the main scanning direction effective region (Yes at step S205), the main scanning region computation unit 506 computes the main scanning region (step S206). If the value counted in step S204 is outside the main scanning direction effective region (No at step S205), the effective/ineffective setting unit 507 outputs the effective/ineffective region signal 509 as an ineffective signal (step S208).

On the other hand, if the value counted in step S204 is within the effective region, the effective/ineffective region setting unit 507 outputs the effective/ineffective region signal 509 as an effective signal (step S207). Next, the region specification unit 508 specifies a region based on the region signal from the sub-scanning region computation unit 505 and the region signal from the main scanning region computation unit 506, and outputs the specified region as the region signal 510.

If processing in the main scanning direction has not ended (No at step S210), the processing of steps S204 to S209 is repeated. If processing in the main scanning direction has ended (Yes at step S210), the processing advances to step S211. If reading of the document image has not ended (No at step S211), the processing of steps 201 to S210 is repeated. If reading of the document image has ended (Yes at step S211), an end notification indicating that reading of the document image 203 has ended is output to the CPU 103 (step S212).

Operation Flow of Histogram Generation Unit 304

Next, the operation flow of the histogram generation unit 304 in a state where control by the region control unit 303 shown in FIG. 11A has been performed will be described. FIG. 13 is a diagram representing the control flow of the histogram generation unit 304. The histogram generation unit 304 does not perform control until input of the effective/ineffective region signal 509, the region signal 510 and the image data 301 are received from the region control unit 303 (in the case where No is determined at step S301). Upon the data allocation unit 701 receiving output of the effective/ineffective region signal 509, the region signal 510 and the image data 301 from the region control unit 303, the processing advances to step S302 (in the case where Yes is determined in Step S301). At S302, the data allocation unit 701 refers to the effective/ineffective region signal 509, and does not perform data allocation to the histograms if an ineffective signal (No at step S302). In the case where the effective/ineffective region signal 509 is an effective signal, the processing advances to S303 (in the case where Yes is determined at step S302). Control is then performed so as to reflect the frequencies of pixel values in the first to ninth histograms according to the region signal 510 (step S303). The histogram generation unit 304 repeats the control of the above steps S301 to S303 (in the case where No is determined at step S304) until notified that document reading has ended by the region control unit 303 (step S212). When the document reading end notification is received (in the case where Yes is determined at step S304), the processing advances to step S305. The histogram generation unit 304 then notifies the CPU 103 that histogram generation has ended, and ends the processing (step S305).

Operation Flow of Edge Information Generation Unit 306 (FIG. 14)

Next, the operation flow of the edge information generation unit 306 in a state where control by the region control unit 303 shown in FIG. 11A has been performed will be described. FIG. 14 is a diagram representing the control flow of the edge information generation unit 306. The edge information generation unit 306 does not perform control until input of the effective/ineffective region signal 509, the region signal 510 and the image data 301 are received from the region control unit 303 (in the case where No is determined at step S401). Upon the edge extraction unit 704 receiving output of the image data 301 from the region control unit 303, the processing advances to step S402 (in the case where Yes is determined in S401). The edge extraction unit 704 then performs edge extraction on the image data 301 (S402). The data allocation unit 701, upon receipt of output of the edge signal from the edge extraction unit 704 and output of the effective/ineffective region signal 509 and the region signal 510 from region control unit 303, refers to the effective/ineffective region signal 509. In the case where the effective/ineffective region signal 509 is an ineffective signal, the data allocation unit 701 does not perform data allocation to the edge counts (in the case where No is determined at step S403). In the case where the effective/ineffective region signal 509 is an effective signal (in the case where Yes is determined at step S403), the processing advances to step S404. Control is then performed so as to reflect the frequencies of pixel values in the first to ninth edge counts according to the region signal 510 (step S404). The edge information generation unit 306 repeats the control of the above step S401 to S404 (in the case where No is determined at step S405) until notified that document reading has ended by the region control unit 303 (step S212). When the document reading end notification is received, the processing advances to step S406 (in the case where Yes is determined at step S405). The edge information generation unit 306 then notifies the CPU 103 that edge information generation has ended, and ends the processing (step S406).

Figure 15:
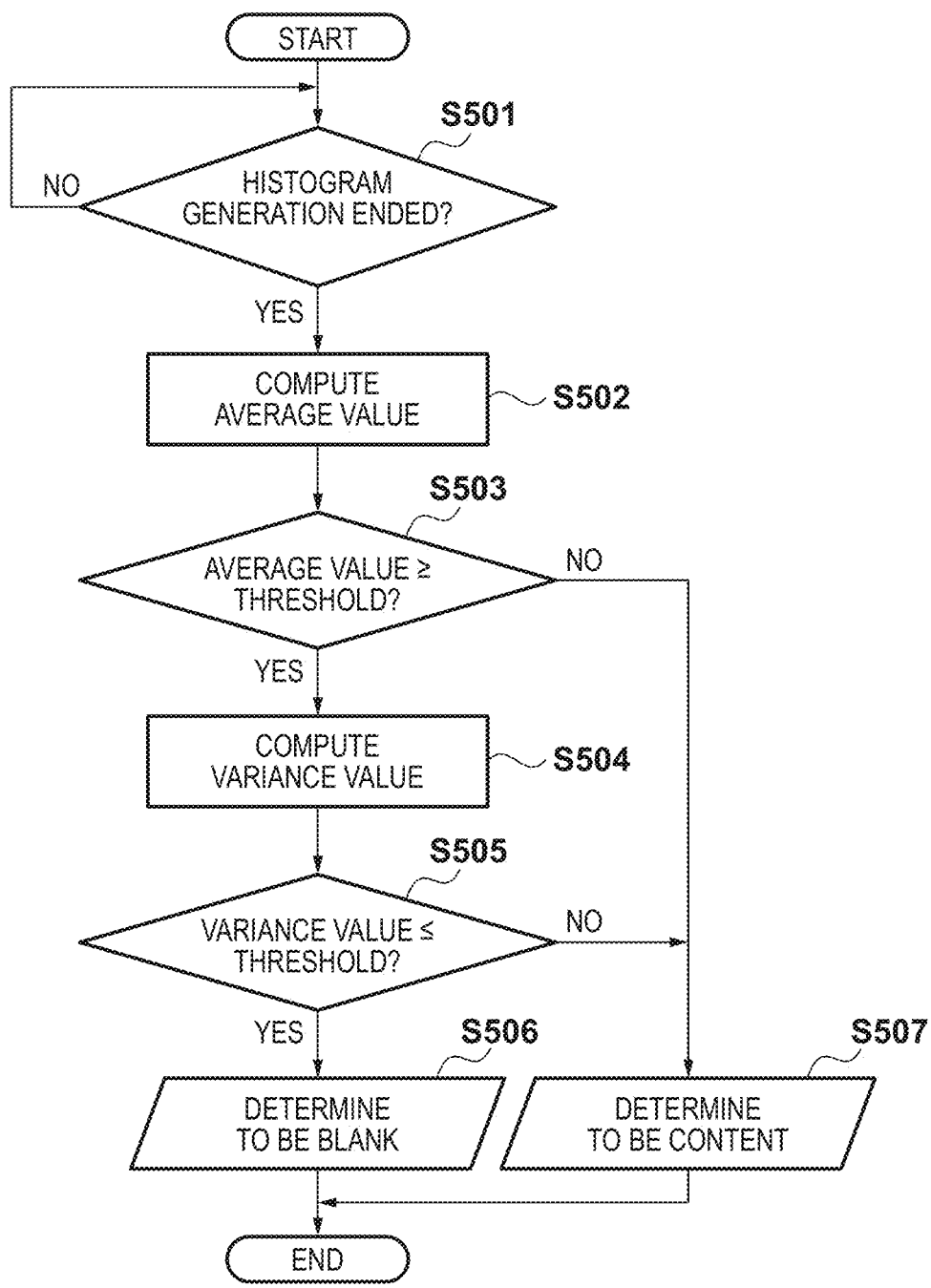
FIG. 15 is a diagram showing the control flow of the histogram analysis unit in the first embodiment.

Operation Flow of Histogram Analysis Unit 305 (FIG. 15)

Next, the operation flow of the histogram analysis unit 305 in a state where control by the histogram generation unit 304 shown in FIG. 13 has been performed will be described. FIG. 15 is a diagram showing the control flow of the histogram analysis unit 305. The histogram analysis unit 305 does not perform control until notification of the end of histogram generation is received from the histogram generation unit 304 (step S501). Upon receipt of the histogram generation end notification from the histogram generation unit 304, the average value computation unit 801 computes average values from the histograms of regions 1 to 9 (step S502). Next, the average value determination unit 803 compares the average values with a threshold (in the case where No is determined at step S503), and if less than the threshold, the histogram determination unit 805 determines the image data to be content, and the histogram analysis unit 305 outputs a determination signal as content (step S507). The average value determination unit 803 compares the average values with a threshold, and if greater than or equal to the threshold (in the case where Yes is determined at step S503), the variance value computation unit 802 computes variance values of the first to ninth histograms (step S504). If the variance values computed by the variance value determination unit 804 are greater than a threshold (in the case where No is determined at step S505), the histogram determination unit 805 determines the image data to be content, and the histogram analysis unit 305 outputs a determination signal as content (step S507). If the variance computed by the variance value determination unit 804 is less than or equal to the threshold (in the case where Yes is determined at step S505), the histogram determination unit 805 determined that the image data is a blank page, and the histogram analysis unit 305 outputs a determination signal as a blank page, and ends the processing (step S506).

Figure 16:
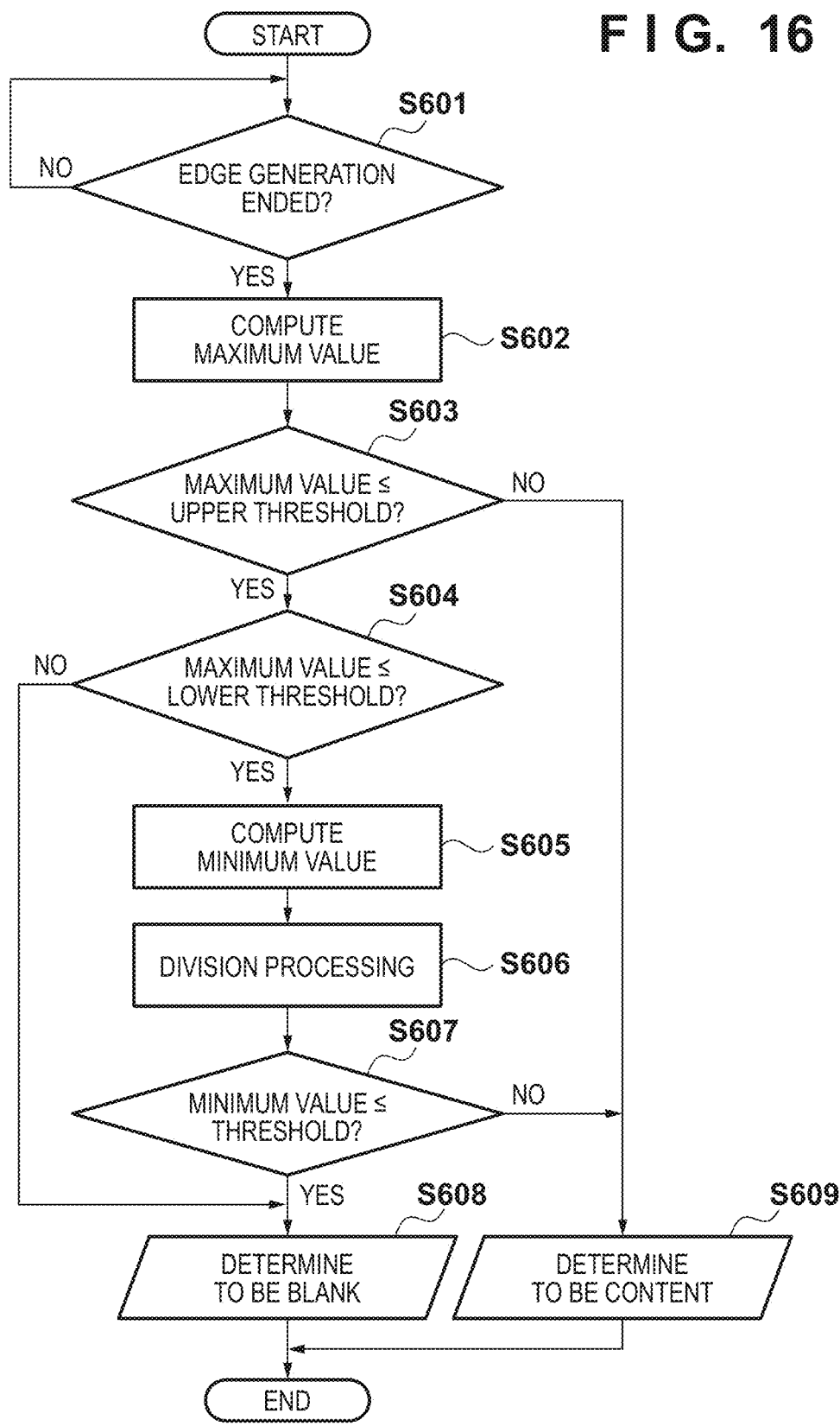
FIG. 16 is a diagram showing the control flow of the edge information analysis unit in the first embodiment.

Operation flow of Edge Information Analysis Unit 307 (FIG. 16)

Next, the operation flow of the edge information analysis unit 307 in a state where control by the edge information generation unit 306 shown in FIG. 14 has been performed will be described. FIG. 16 is a diagram showing the control flow of the edge information analysis unit 307. The edge information analysis unit 307 does not perform control until notification of the end of edge information generation is received from the edge information generation unit 306 (step S601). When the edge information generation end notification is received from the edge information generation unit 306, the maximum value computation unit 1001 computes the maximum edge count from the edge counts of regions 1 to 9 (step S602). Next, the upper limit determination unit 1003 compares the computed maximum edge count with a threshold, if greater than the threshold (in the case where No is determined at step S603), the edge determination unit 1007 determines the image data to be content, and the edge information analysis unit 307 outputs a determination signal as content. If the upper limit determination unit 1003 determines that the computed maximum edge count is less than or equal to the threshold (in the case where Yes is determined at step S603), the processing advances to step S604. The lower limit determination unit 1004 compares the computed maximum edge count with a threshold, and if less than the threshold (No at step S604), the edge determination unit 1007 determines the image data to be a blank page, and the edge information analysis unit 307 outputs a determination signal as a blank page (step S608).

If the lower limit determination unit 1004 determines that the computed maximum edge count is greater than or equal to the threshold (in the case where Yes is determined in S604), the minimum edge count is computed from the edge counts of regions 1 to 9 using the minimum value computation unit 1002 (step S605). Next, division processing with the maximum edge count and the minimum edge count is performed using the division unit 1005 (step S606). If the division result is less than a threshold (No at step S607), the edge determination unit 1007 determines the image data to be content, and the edge information analysis unit 307 outputs a determination signal as content (S609). If the division result is greater than or equal to the threshold (Yes at step S607), the edge determination unit 1007 determines the image data to be content, and the edge information analysis unit 307 outputs a determination signal as a blank page and ends processing (S608).

As mentioned above, the image targeted for determination is divided into small regions, determination is performed on each of the divided regions, and if a similar tendency is exhibited, it can be determined that there is a possibility of the image being a blank page. Also, weaknesses in both determinations can be overcome by combined usage of blank page determination using the frequency distribution of luminance values and edge counts. Specifically, in the first embodiment, by generating a histogram and an edge count for each divided region, it becomes possible to discriminate a small amount of content from a document containing contaminants such as dust or dirt. Also, by using edge information to distinguish content printed at low density from show-through, and using variance between regions in the determination, it becomes possible to determine recycled paper to be a blank page while using edge information.

FIG. 22 shows blank page detection results according to the present embodiment 1. With the conventional technology, in the case where parameters or the like are set so to be able to detect image 2 as a blank page, image 3 and image 5 will also be detected as blank pages. Also, even though image 8 and image 9 can be discriminated with the conventional technology in the case where edge information is used, if parameters or the like are set to detect image 3 and image 5 as content, image 7 will be detected as a blank page. Conversely, if parameters or the like are set so as to detect image 7 as content, image 3 and image 5 will be detected as blank pages.

In contrast, with the image processing apparatus according to the present embodiment, by dividing the image into small regions and performing blank page determination by histogram and blank page determination by edge count for each divided region, it becomes possible to detect blank pages correctly for all of images 1 to 9. That is, images 1, 2, 4 and 6 are detected as blank pages, and images 3, 5, 7 and 8 detected as content.

In the present embodiment, it is determined whether a document image is blank or content based on determination by histogram and determination by edge count. However, for example, a configuration may be adopted in which determination by edge count is not performed in the case where a document image is discriminated as content in the determination by histogram.

Second Embodiment

In the first embodiment, a method for performing blank page detection in a state where the document size of the document images 203 has been determined by the document size detection sensor 207 and the document guide 209 was described. However, while this method is effective in the case where all documents are the same size, with the document size detection sensor 207, it is difficult to perform document size detection before reading is started in the case where document size varies from sheet to sheet such as with mixed loading of documents. In other words, histograms and edge information cannot be generated for each divided region when reading is carried out. In the present embodiment, a method for dividing an image into regions in the case where document size detection in the sub-scanning direction cannot be performed before reading is started will be described.

In the present embodiment, the configuration of the ADF 201 for automatically feeding documents and the internal configuration of the region control unit 303 are different. The configuration of the ADF 201 in the present embodiment is shown in FIG. 23. Note that in this diagram, the same reference signs are given to constituent elements that are the same as those shown in the first embodiment. In FIG. 23A, reference sign 2301 is a trailing edge position detection sensor that detects the position of the trailing edge portion of a document image 203, and the trailing edge of the document image 203 can be detected during reading at the point in time at which the trailing edge of the document image 203 is conveyed to a position that past the trailing edge detection sensor 2301. Image data of the document image 203 that has not been read at this point in time will be a document image having a size ranging from the position of the trailing edge detection sensor 2301 to the reading position 205. Since the length from the position of the trailing edge detection sensor 2301 to the reading position 205 is unambiguously determined by the mechanical configuration of the image processing apparatus, the CPU 203 can regard the number of lines of the document image data constituting this length as a predetermined value. Note that this predetermined value may change according to the conveyance speed of document image data. For example, since there is a two-fold difference in conveyance speed between reading document image data at a resolution of 600 dpi and at a resolution of 300 dpi in the conveyance direction of the document image, the number of lines between the position of the trailing edge detection sensor 2301 and the reading position 205 of the reading device 208 varies. Accordingly, the CPU 203 performs control after having managed the predetermined value according to the reading resolution of the ADF 201 in the sub-scanning direction of the document image.

Figure 25:
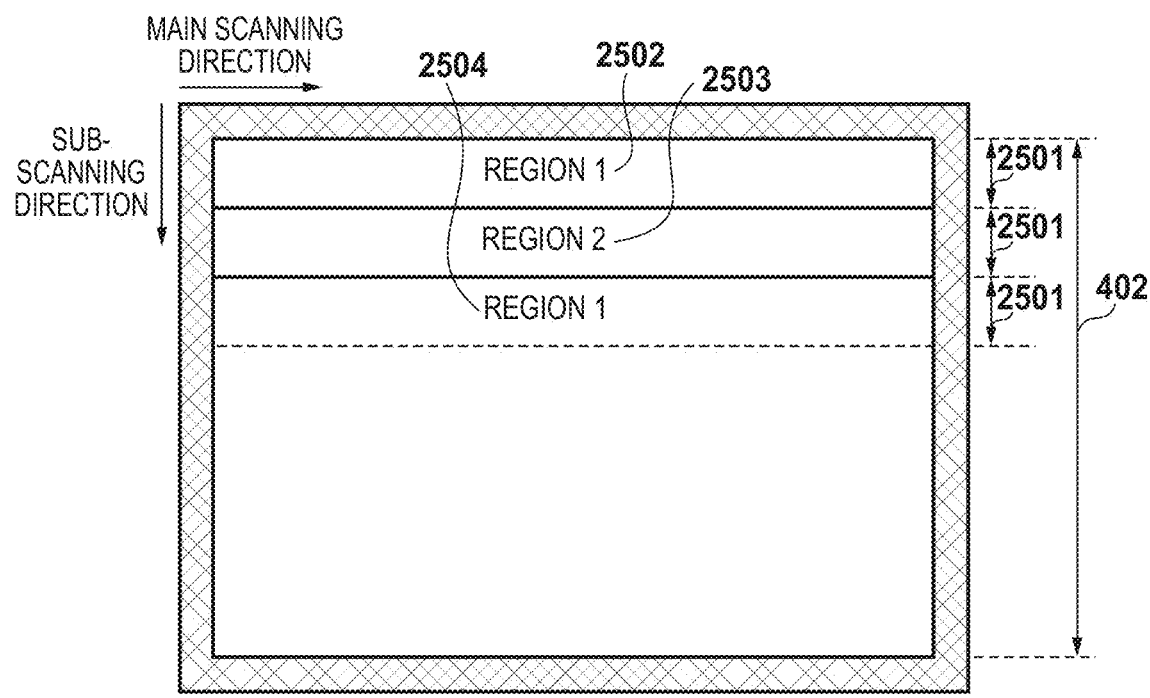
FIG. 25 is a diagram showing an example of region division in the second embodiment.

FIG. 24 is a diagram showing the internal configuration of the region control unit 303 in the present embodiment. Note that, in this diagram, the same reference signs are similarly given to constituent elements that are the same as those shown in the first embodiment. The region control unit 303 in the present embodiment is not able to implement the method of dividing an image in the sub-scanning direction shown in FIG. 4 in the first embodiment. The reasons for this will be described using FIG. 25. In the present embodiment, since the size in the sub-scanning direction has not been determined at the time that reading is started, division positions for equally dividing an image in the sub-scanning direction cannot be readily decided in advance. In view of this, in order to divide a region in the sub-scanning direction and generate both histograms with equal numbers of samples and edge counts, division is performed with a standard region width 2501 of predetermined size shown in FIG. 25. That is, rather than designating division positions, the length of the divided regions in the sub-scanning direction is set in advance. For example, as shown in FIG. 25, two regions are set one after the other in the sub-scanning direction. In other words, the region control unit 303 performs control so as to generate a histogram and edge information with a region 2502 as the first region in the sub-scanning direction. Also, the region control unit 303 performs control so as to generate a histogram and edge information with a region 2503 as the second region in the sub-scanning direction. Since generation of two histograms and edge information is performed in the sub-scanning direction in this example, the region control unit 303 performs control so as to generate a histogram and edge information with the next region 2504 as a first region in the sub-scanning direction. Note that, in the region control unit 303 of the present embodiment, the number of region divisions in the sub-scanning direction is not limited to two. In other words, if the sub-scanning region is divided into three regions, the region control unit 303 may perform control so as to generate a histogram and edge information with the region 2504 as a third region in the sub-scanning direction.

Here, the setting value of the standard region width 2501 is determined by the detection target. For example, the setting value is determined by the font size and the reading resolution of text data serving as the detection target. For example, in the case where the detection target is 10.5 pt text read at a resolution of 600 dpi, the pixel count in the sub-scanning direction constituting the 10.5 pt text will be about 88 pixels. Accordingly, in this case, the standard region width 2501 is set to 128, which is a power of two value of a size encompassing the pixel count of the sub-scanning direction. Note that, in the above description, although a power of two value is used in order to simplify processing configuration in terms of the hardware configuration and control, the standard region width 2501 in the present embodiment is not restricted thereto. That is, the sub-scanning pixel count value constituting the detection target may be directly used, or the result of a multiplication or division with a predetermined coefficient may be used.

Control based on the standard region width 2501 in the region control unit 303 is performed by a sub-scanning line counter 2401 and a third comparison unit 2402 shown in FIG. 24. The sub-scanning line counter 2401 starts counting upon receiving an effective/ineffective region signal from the comparison unit 2402. That is, the sub-scanning line counter 2401 only performs counting between the sub-scanning direction effective regions 402. The comparison unit 2402 compares the count value of the sub-scanning line counter 2401 with the setting value of the standard region width 2401. The comparison unit 2402 changes and outputs the targeted region, if the count value of the sub-scanning line counter 2401 matches the standard region width 2501. Also, at the same time a reset signal for starting counting by the sub-scanning line counter 2401 from an initial state is output. The sub-scanning line counter 2401 returns the count value to an initial value upon receiving the reset signal from the comparison unit 2402, and starts counting after receiving an effective/ineffective region signal from the comparison unit 503. The region specification unit 508 specifies a region as a first region in the sub-scanning direction until a different region signal is received from the comparison unit 2402. The region specification unit 508 specifies a region as the second region in the sub-scanning direction upon receiving a different region signal from the comparison unit 2402. In other words, as a result of this control, a histogram and edge information are generated with the region 2502 shown in FIG. 25 as the first region in the sub-scanning direction. Also, a histogram and edge information are generated with the region 2503 as the second region in the sub-scanning direction. Also, a histogram and edge information are generated with the next region 2504 as the first region in the sub-scanning direction.

Figure 26:
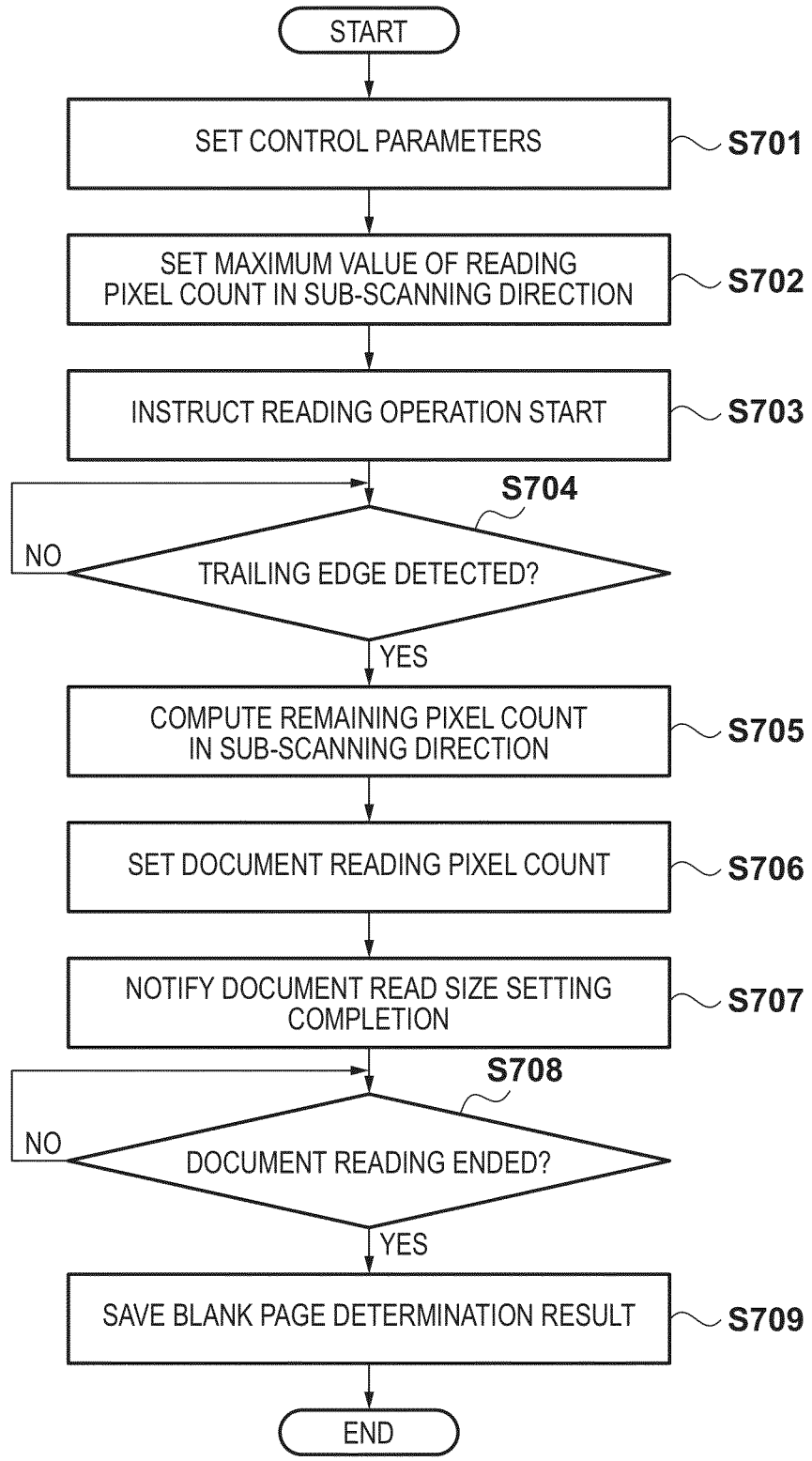
FIG. 26 is a diagram showing a control flow of a CPU 103 in the second embodiment.

Next, the control flow of the CPU 103 in the present embodiment will be described using the drawings. FIG. 26 is a diagram showing the control flow of the CPU 103 for controlling the region control unit 303 of the present embodiment. The CPU 103 sets various parameters to be used by the blank page detection processing unit 112, such as region division positions, the standard region width 2501 and the like (step S701). Note that, in reading by the ADF 201, the pixel count up to the trailing edge shadow portion shown in FIG. 25 is set to the maximum value possible, since the document size has not been determined when reading of document image data is started. Then, the reading pixel count in the sub-scanning direction of document image data is set (step S702). Note that since document size has also not been determined when reading is started with regard to setting of the reading pixel count in the sub-scanning direction, the maximum value possible is set in step S702. The CPU 103 performs reading operation start instruction upon completion of the above settings (step S703). The CPU 103 does not change the setting values set at steps S701 and S702 until the trailing edge is detected by the trailing edge detection sensor 2301 during the reading operation of the document image 203 (in the case where No is determined at step S704). The CPU 103, upon receiving input of the trailing edge detection signal of the document image 203 from the trailing edge detection sensor 2301 (in the case where Yes is determined at step S704), computes the remaining pixel count in the sub-scanning direction according to the mechanical configuration of image processing apparatus and operating parameters such as the reading resolution of the document image data 203 (step S705). Specifically, the reading pixel count in the sub-scanning direction of a region from the position of the trailing edge detection sensor 2301 to the reading position 208 determines the document image size, based on parameters such as the resolution when the document reading operation is performed.

Once the reading pixel count calculation in the sub-scanning direction of step S705 has ended, the CPU 103 sets the pixel count up to the trailing edge shadow portion of document image data and the reading pixel count in the sub-scanning direction following document size determination (step S706). In other words, values based on the document size determination are set for the setting target with respect to which the maximum values possible were set in step S701. Furthermore, the CPU 103 sends a setting completion notification indicating that setting of the reading pixel count in the sub-scanning direction following document size determination is completed (step S707). The CPU 103 then waits for notification that reading of the document image 203 is completed, and ends control at the point in time that notification is input (step S708). Finally, blank page determination is performed based on the result of determination for each divided region performed in the same manner as the first embodiment, and the determination result is stored in a memory or the like.

Note that because the shape and area of the divided regions are required to be equal to each other in order to perform blank page determination with high precision, it is desirable to perform control so that only portions of a read document image that can be divided such that the shape and area of divided regions will be uniform are used as determination targets, and so that the remaining odd-shaped regions are not used for determination. In this case, because the length of the divided regions in the sub-scanning direction and the number of groups of divided regions are set in advance, and the number of remaining sub-scanning lines at the point in time that the trailing edge of the document is detected is clear, the final divided region to be used for blank page determination can be determined at the point in time that the trailing edge of a document is detected. Note that the number of groups of divided regions referred to here are groups of regions constituted by collecting regions that appears every predetermined number of regions in the sub-scanning direction rather than individual regions, such as the first region and the second region illustrated in FIG. 25, and in the present embodiment these groups are equivalent to the individual divided regions in the first embodiment. This "predetermined number" is equivalent to the number of groups, that is, the number of regions.

Note that, in the present embodiment, since the control flow after the histogram analysis unit 305 and the edge information analysis unit 307 is similar to the first embodiment, description is omitted.

As described above, even in the case of reading a document whose size has not been determined when reading is started according to the second embodiment, the region can be divided in the sub-scanning direction of the document by a uniform number of samples. It thereby becomes possible to perform blank page detection based on the variance in the edge information and the histogram information acquired from each region of the document.

Note that, in this example, the divided regions are not divided in the main scanning direction, and as long as the length, that is, the width, of the document in the main scanning direction can be detected in advance by a sensor, the region may also be divided uniformly in the main scanning direction as with the first embodiment.

Third Embodiment

In the first embodiment, a method that involves dividing the document image 203 into 3×3 regions, generating a histogram and edge information from each region, and performing blank page detection based on the histogram and edge information of each region was described.

However, the layout that is printed on the document surface is not limited to a 1-in-1 print in which 1 page is assigned to 1 side of the paper. For example, there are also documents that are printed with a plurality of pages assigned to one side, such as a 2-in-1 or 4-in-1 print. A digital multifunction peripheral or the like, in the case where 2 pages of A4 size are printed on one side of A3 paper, has a division function of dividing the read image in two, and outputting or transmitting each image individually. With the blank page detection methods of the first and second embodiments, since it is determined whether the entire read image is blank while reading the image, in the case of using the division function, it cannot be discriminated whether one of the divided images is a blank page. Thus, blank pages may end up being output or transmitted.

In the present embodiment, a method in which the region division position is changed according to the N-in-1 state, that is, the layout, of the printed document, and a plurality of blank page determination results are output from one image data will be described.

Hereinafter, blank page detection processing in the present embodiment will be described using the drawings. FIG. 27 is an example of an operation screen for setting the N-in-1 state of a document in the present embodiment. A 1-in-1 button 2702, a 2-in-1 button 2703, a 4-in-1 button 2704, a Cancel button 2705, and an OK button 2706 are arranged on an N-in-1 setting screen 2701. The user designates the type of division of the document image by selecting the 1-in-1 button 2702, the 2-in-1 button 2703 or the 4-inch button 2704. When the user presses the OK button 801 after making a selection, the settings of N-in-1 setting that was most recently selected are held, and this operation screen is closed. When the user presses the cancel button 802, the settings of the N-in-1 setting that was most recently selected before opening this operation screen are held, and this operation screen is closed. The operation unit 116 notifies the settings that are configured on this operation screen to the CPU 103.

Figure 28A:
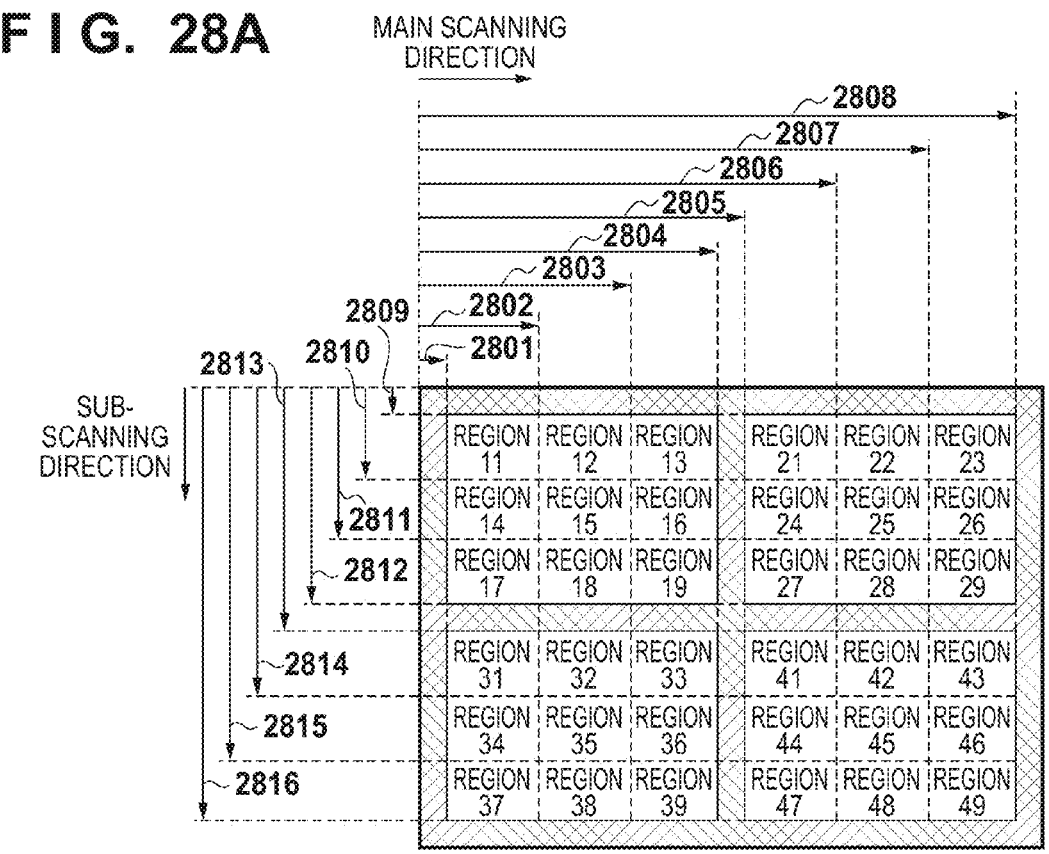
FIGS. 28A and 28B are diagrams showing an example of region division in the third embodiment.

Next, an example of region division in the present embodiment will be described using the drawings. FIG. 28A shows an example of region division on a 4-in-1 document in the present embodiment. The shaded portion in the diagram indicates the ineffective region, with this being a region in which histogram generation and edge information generation are not performed. With a 4-in-1 document image or the like, a document frame may be printed depending on the application. In the case where this document frame is read, it may not be possible to discriminate the document image as being a blank page due to the influence of the document frame, despite the document itself having no print information. In other words, it is necessary to set an ineffective region in the middle of the document image in both the main scanning direction and the sub-scanning direction.

Figure 28B:
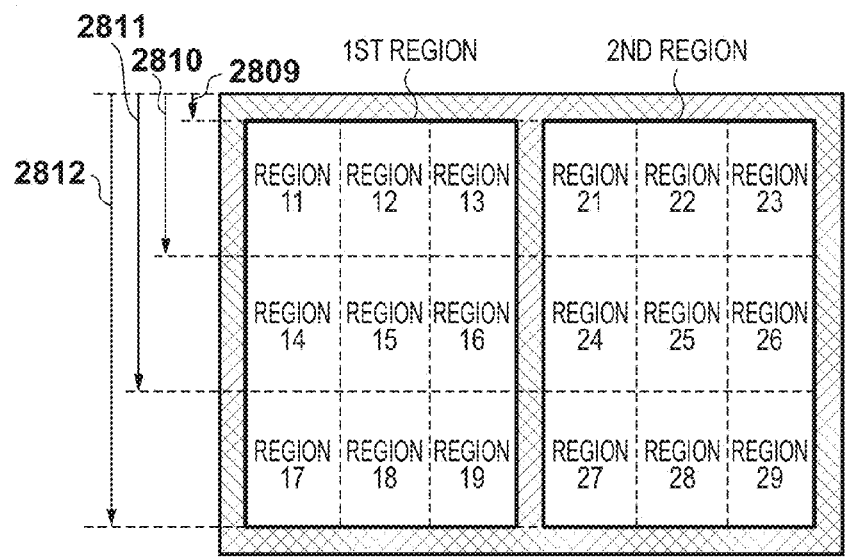

The main scanning division positions 2801 to 2808 and the sub-scanning division positions 2809 to 2816 in FIG. 28A are set by the CPU 103. Here, if the setting value received from the operation unit 116 is 4-in-1, the main scanning division positions 2801 to 2808 and the sub-scanning division positions 2809 to 2816 shown in FIG. 28A are set. Also, if the setting values received from the operation unit 116 is 2-in-1, two division positions can be set in the image data such as shown in FIG. 28B, by setting the sub-scanning division positions 2813 to 2816 to the maximum values possible.

Next, methods of region control and analysis processing in the present embodiment will be described. Although the number of set regions in the first comparison unit 503, the second comparison unit 504, the sub-scanning region computation unit 505 and the main scanning region computation unit 506 increases in the region control unit 303 of the present embodiment, description is omitted, since the region division method in the region control unit 303 is similar to that of the first embodiment. Also, although the number of allocated regions increases with regard to the histogram generation unit 304 and the edge information generation unit 306, description is omitted, since the allocation method in the histogram generation unit 304 and the edge information generation unit 306 is similar to that of the embodiment 1.

The histogram analysis unit 305 and the edge information analysis unit 307 control the histograms and the edge count regions that are referred to according to the N-in-1 state notified by the CPU 103. Specifically, in the case where the N-in-1 state notified from the CPU 103 is 2-in-1, the histograms and edge information that were generated for the first region and the second region, that are shown in FIG. 28B, are read and analyzed. The processing of the histogram analysis unit 305 and the edge information analysis unit 307 is repeatedly executed for the number of regions. Also, a plurality of histogram analysis units 305 and edge information analysis units 307 may be arranged, and a plurality of regions may be processed in parallel. The blank page determination unit 308 performs blank page determination processing using the determination results of the histogram analysis unit 305 and the edge information analysis unit 308 for each region. In other words, a plurality of blank page determination results that depend on the N-in-1 setting value configured in the operation unit 116 are output. Also, a plurality of blank page determination unit 308 may be disposed, and a plurality of regions may be processed in parallel.

Figure 29:
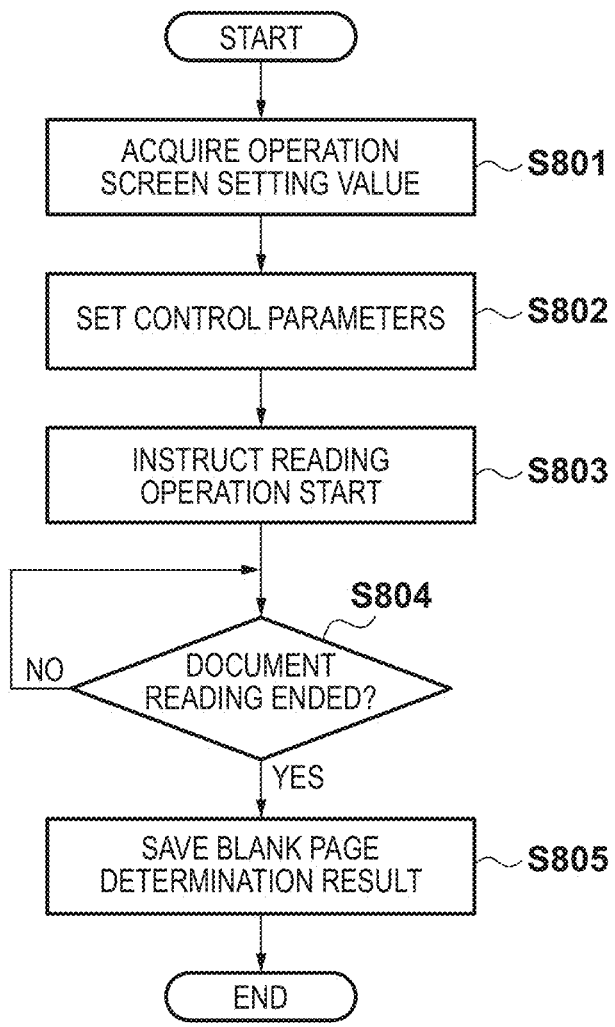
FIG. 29 is a diagram showing the control flow of a CPU 103 in the third embodiment.

FIG. 29 is a diagram showing the control flow of the CPU 103 in the present embodiment. The CPU 103 acquires a setting value indicating the N-in-1 state notified from the operation unit 116 (step S801). Next, the CPU 103 sets the region division positions and various parameters to be used by the blank page detection processing unit 112 based on the N-in-1 setting value acquired at step S801 (step S802). Hereinafter, since the control flow of steps S803 to S804 is similar to the control flow of steps S103 to S104 shown in FIG. 11A, description thereof is omitted.

The CPU 103, in step 804, saves the blank page detection results in association with respective image data, in the case where the image data is divided in the N-in-1 state.

In the third embodiment, a method has been described in which a plurality of determination regions are generated according to the N-in-1 state of the document set by the operation unit 116, and the blank page determination result for each region is output. In short, the present embodiment is an embodiment in which the blank page determination method of the first embodiment or the second embodiment is applied to each post-division page obtained by dividing the read document image by the specified layout.

According to the present embodiment, it becomes possible to output a plurality of determination results from one image, and even in the case of outputting image data in an N-in-1 state, it becomes possible to perform blank page determination with respect to each output surface.

Effects of Embodiments

According to any of the above embodiments, it is possible to appropriately discriminate image data obtained by reading a document in which a small amount of text is printed from image data obtained by reading document containing unexpected image objects such as contaminants and the like. Also, the image data of paper containing many impurities such as recycled paper and the image data that is only show-through can be detected as a blank page, and it is possible to appropriately detect that the image data of a document printed at a low density is not a blank page. In other words, blank page detection with high precision becomes possible.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-091783, filed Apr. 24, 2013 which is hereby incorporated by reference herein in its entirety.

What is claimed is:

1. An image processing apparatus comprising:
   at least one processor; and
   at least one memory having instructions stored thereon, which when executed by the at least one processor, cause the image processing apparatus to:
   divide image data obtained by reading a document into a plurality of regions, and
   determine whether the document is blank or has content using a correlation value obtained from a maximum edge count and a minimum edge count of edge counts obtained from respective divided regions.

2. The image processing apparatus according to claim 1, wherein the document is determined to have content if the maximum edge count is greater than or equal to a first threshold.

3. The image processing apparatus according to claim 1, wherein the document is determined to be blank if the maximum edge count is less than or equal to a first threshold and is less than or equal to a second threshold.

4. The image processing apparatus according to claim 1, wherein, if the maximum edge count is less than or equal to a first threshold and is greater than or equal to a second threshold, a correlation value between the maximum edge count and the minimum edge count is acquired and if the correlation value is greater than or equal to a third threshold, the document is determined to be a blank page.

5. The image processing apparatus according to claim 1, wherein the at least one memory has stored thereon further instructions, which when executed by the at least one processor, cause the at least one processor to:
set a peripheral portion of the image data as an ineffective region,
wherein dividing the image data includes dividing an effective region that excludes the ineffective region from the image data obtained by reading a one page document into a plurality of regions.

6. The image processing apparatus according to claim 1, wherein the correlation value is a value calculated by dividing one of the maximum edge count and the minimum edge count by the other of the maximum edge count and the minimum edge count.

7. An image processing apparatus comprising:
at least one processor; and
at least one memory having instructions stored thereon, which when executed by the at least one processor, cause the image processing apparatus to:
divide image data obtained by reading a document into a plurality of regions,
acquire variance values of pixel values obtained from the image data of each divided region, and determine whether the document is blank using the acquired variance values,
acquire edge counts from the image data of respective divided regions, and determine whether the document is blank using the acquired edge counts, and
determine that the document has content in a case where at least one of:
1) a result of the determination whether the document is blank using the acquired variance values, or
2) a result of the determination whether the document is blank using the acquired edge counts,
indicates a determination result that the document has content.

8. The image processing apparatus according to claim 7, wherein the determination whether the document is blank using the acquired variance values includes determining that content is not included if an average value of the pixel values derived from the image data of each acquired region is greater than or equal to a second threshold, and determining that the document is blank if it is determined that content is not included for all of the regions.

9. The image processing apparatus according to claim 7, wherein if both the determination whether the document is blank using the acquired variance values and the determination whether the document is blank using the acquired edge counts determine that the document is blank, the document is determined to be blank, and if at least one of the determination whether the document is blank using the acquired variance values or the determination whether the document is blank using the acquired edge counts determine that the document has content, the document is determined to have content.

10. The image processing apparatus according to claim 7, wherein the at least one memory has stored thereon further instructions, which when executed by the at least one processor, cause the image processing apparatus to:
set a peripheral portion of the image data of one page as an ineffective region,
wherein dividing the image data includes dividing an effective region that excludes the ineffective region from the image data obtained by reading the document into a plurality of regions.

11. The image processing apparatus according to claim 7, wherein the at least one memory has stored thereon further instructions, which when executed by the at least one processor, cause the at least one processor to:
apply a correction to the image data before obtaining variance values of pixel values,
wherein pixels values within a predetermined range from an average of the pixel values are converted into the average of the pixel values.

12. The image processing apparatus according to claim 7, further comprising an automatic document feeder that includes a detection unit that detects a trailing edge portion of the read document,
wherein dividing the image data includes, while reading the document conveyed by the automatic document feeder, substantially uniformly dividing the image data obtained by reading the document in at least a conveyance direction of the document, and
wherein whether the read document is blank is determined by taking groups of predetermined numbers of the divided regions in a sub-scanning direction as one region.

13. The image processing apparatus according to claim 7, wherein the at least one memory has stored thereon further instructions, which when executed by the at least one processor, cause the image processing apparatus to:
select a document layout,
wherein the region is divided as one page of image data, and taking one page of the selected layout as one page of image data, whether a document corresponding to the one page of image data is blank is determined.

14. An image processing method comprising:
dividing image data obtained by reading a document into a plurality of regions; and
determining whether the document is blank or has content using a correlation value obtained from a maximum edge count and a minimum edge count of edge counts obtained from respective regions divided in the dividing.

15. A non-transitory computer-readable storage medium storing a program which, when loaded onto a computer and executed, causes the computer to execute a process, the process comprising:
dividing image data obtained by reading a document into a plurality of regions; and
determining whether the document is blank or has content using a correlation value obtained from a maximum edge count and a minimum edge count of edge counts obtained from respective regions divided in the dividing.

16. An image processing method comprising:
dividing image data obtained by reading a document into a plurality of regions;
acquiring a variance value in pixel values obtained from the image data of each region divided in the dividing, and determining whether the document is blank using the acquired variance values;
acquiring edge counts from the image data of respective regions divided in the dividing;
determining whether the document is blank using the acquired edge counts; and
determining that the document has content in a case where at least one of:
1) a result of the first determining, or
2) a result of the second determining,
shows a determination result that the document has content.

17. A non-transitory computer-readable storage medium storing a program which, when loaded onto a computer and executed, causes the computer to execute a process, the process comprising:

dividing image data obtained by reading a document into a plurality of regions;

acquiring a variance value in pixel values obtained from the image data of each region divided in the dividing, and determining whether the document is blank using the acquired variance values;

acquiring edge counts from the image data of respective regions divided in the dividing;

determining whether the document is blank using the acquired edge counts; and determining that the document has content in a case where at least one of:

1) a result of the first determining, or 2)a result of the second determining, shows a determination result that the document has content.

* * * * *